(12) United States Patent
Shibasaki et al.

(10) Patent No.: US 9,204,015 B2
(45) Date of Patent: Dec. 1, 2015

(54) IMAGE PROCESSING APPARATUS AND IMAGE PROCESSING METHOD

(75) Inventors: Akira Shibasaki, Kawasaki (JP);
Hiromitsu Nishikawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 138 days.

(21) Appl. No.: 13/812,468

(22) PCT Filed: Jul. 21, 2011

(86) PCT No.: PCT/JP2011/004114
§ 371 (c)(1),
(2), (4) Date: Jan. 25, 2013

(87) PCT Pub. No.: WO2012/014412
PCT Pub. Date: Feb. 2, 2012

(65) Prior Publication Data
US 2013/0128291 A1    May 23, 2013

(30) Foreign Application Priority Data
Jul. 28, 2010  (JP) ................. 2010-169601

(51) Int. Cl.
G06K 15/02 (2006.01)
H04N 1/60 (2006.01)
H04N 1/54 (2006.01)

(52) U.S. Cl.
CPC .............. *H04N 1/6027* (2013.01); *H04N 1/54* (2013.01)

(58) Field of Classification Search
USPC .......................... 358/1.9, 500, 501, 502, 503
See application file for complete search history.

(56) References Cited

U.S. PATENT DOCUMENTS

| | | |
|---|---|---|
| 2004/0233463 A1 | 11/2004 | Hersch |
| 2005/0057604 A1 | 3/2005 | Ogasawara |
| 2007/0243314 A1 | 10/2007 | Jinno |
| 2007/0285679 A1 | 12/2007 | Umezawa |
| 2008/0112608 A1 | 5/2008 | Yang |
| 2009/0092405 A1 | 4/2009 | Washino |
| 2009/0160885 A1 | 6/2009 | Takekoshi |
| 2009/0296116 A1 | 12/2009 | Asai |

(Continued)

FOREIGN PATENT DOCUMENTS

| | | |
|---|---|---|
| CN | 101403876 A | 4/2009 |
| CN | 101462400 A | 6/2009 |
| JP | 2006-177797 A | 7/2006 |
| JP | 2008-143135 A | 6/2008 |
| JP | 2008-162094 A | 7/2008 |

(Continued)

*Primary Examiner* — Jerome Grant, II
(74) *Attorney, Agent, or Firm* — Canon USA, Inc. IP Division

(57) ABSTRACT

An image processing apparatus may include a conversion unit, a determination unit, and a calculation unit to convert image data into color material data indicating a chromatic color material amount and an achromatic color material amount. The conversion unit converts image data of a pixel of interest into chromatic color material color material data. The determination unit determines achromatic color material color material data on the pixel of interest based on coloring information corresponding to the converted color material data of the chromatic color material and coloring information that occurs at surrounding pixels that surround the interest pixel. The calculation unit calculates coloring information that occurs at the interest pixel based on coloring information corresponding to a combination of the converted color material data of the chromatic color material and the determined color material data of the achromatic color material and the coloring information that occurs at the surrounding pixels.

17 Claims, 28 Drawing Sheets

(56) References Cited

U.S. PATENT DOCUMENTS

2010/0128288 A1  5/2010  Karito
2010/0253957 A1  10/2010  Sano
2013/0120801 A1  5/2013  Shibasaki
2013/0201501 A1* 8/2013  Nishikawa et al. ............ 358/1.9

FOREIGN PATENT DOCUMENTS

| JP | 2008-236219 A | | 10/2008 | |
|----|---------------|---|---------|---|
| JP | 2010-037419 A | | 2/2010 | |
| JP | 2012-034032 A | | 2/2012 | |
| WO | WO2012053153 | * | 4/2012 | ......... G03G 15/0126 |

* cited by examiner

Fig. 6

| INPUT SIGNAL VALUE (8 bit) | | | INK VALUE (8 bit) | COLORING OF SPECULAR REFLECTION LIGHT | |
|---|---|---|---|---|---|
| R | G | B | CL | a* | b* |
| 0 | 0 | 0 | 0 | 3 | 2.3 |
| 0 | 0 | 0 | 32 | 3.7 | 5 |
| ⋮ | ⋮ | ⋮ | ⋮ | ⋮ | ⋮ |
| 0 | 0 | 0 | 255 | −4.7 | −13.2 |
| 0 | 0 | 16 | 0 | 2 | 1 |
| ⋮ | ⋮ | ⋮ | ⋮ | ⋮ | ⋮ |
| 0 | 0 | 16 | 255 | −5 | −15 |
| ⋮ | ⋮ | ⋮ | ⋮ | ⋮ | ⋮ |
| 255 | 255 | 255 | 255 | 7 | 1.4 |

Fig. 21

| INPUT SIGNAL VALUE (8 bit) | | | INK VALUE (8 bit) | |
|---|---|---|---|---|
| R | G | B | CL1 | CL2 |
| 0 | 0 | 0 | 32 | 128 |
| 0 | 0 | 16 | 64 | 96 |
| 0 | 0 | 32 | 64 | 64 |
| ⋮ | ⋮ | ⋮ | ⋮ | ⋮ |
| 255 | 255 | 224 | 32 | 192 |
| 255 | 255 | 240 | 32 | 224 |
| 255 | 255 | 255 | 0 | 255 |

Fig. 24

| INPUT SIGNAL VALUE (8 bit) | | | INK VALUE (8 bit) | | RATIO | |
|---|---|---|---|---|---|---|
| R | G | B | CL1 | CL2 | S_CL1 | S_CL2 |
| 0 | 0 | 0 | 32 | 128 | 30 | 70 |
| 0 | 0 | 16 | 64 | 96 | 40 | 60 |
| 0 | 0 | 32 | 64 | 64 | 50 | 50 |
| ⋮ | ⋮ | ⋮ | ⋮ | ⋮ | ⋮ | ⋮ |
| 255 | 255 | 224 | 32 | 192 | 60 | 40 |
| 255 | 255 | 240 | 32 | 224 | 60 | 40 |
| 255 | 255 | 255 | 0 | 255 | 50 | 50 |

IMAGE PROCESSING APPARATUS AND IMAGE PROCESSING METHOD

CROSS REFERENCE TO RELATED APPLICATIONS

This application is a National Stage filing of PCT application No. PCT/JP2011/004114, filed Jul. 21, 2011, which claims priority from Japanese Patent Application No. 2010-169601, filed Jul. 28, 2010, all of which are hereby incorporated by reference herein in their entirety.

TECHNICAL FIELD

The present invention relates to image processing for recording an image with use of a clear ink.

BACKGROUND ART

Conventionally, there has been an inkjet method of forming an image on a recording medium by attaching inks, which are recording materials (color materials), to the recording medium, as a recording method of recording, for example, a character and an image onto a recording medium such as a recording sheet or a film.

Widely used types of ink for inkjet recording apparatuses are a dye ink, which contains dye as a color material, and a pigment ink, which contains pigment as a color material. The pigment ink contains, for example, resin, water, and a color material, and has such a characteristic that solid contents thereof such as a color material and resin are easily deposited on the surface of a recording medium, compared to the dye ink. FIG. 1 schematically illustrates pigment color materials deposited on a recording medium. Further, forming an image on a recording material using the pigment ink leads to a phenomenon of coloring of specular reflection light which is light reflected by the formed image. More specifically, when an image formed by this kind of recording apparatus is placed under a light source such as a spotlight, although the spotlight emits achromatic light, this light turns into colored specular reflection light after being reflected on a recording medium. For example, in a color image, a region with a cyan ink laid on a large part of the region tends to look colored magenta, while a monochrome image tends to look colored yellow as a whole. Further, such coloring of specular reflection light tends to change in an iridescent manner according to a change in an ink amount (discharge amount) used in a predetermined area of an image. Occurrence of coloring of specular reflection light results in deterioration of the image quality due to a difference between the color of the specular reflection light and the color of the diffused light.

Now, a method of measuring coloring of specular reflection light (Japanese Patent Application Laid-Open No. 2006-1.77797) will be now briefly described with reference to FIG. 2. A measurement sample 201 is irradiated with light by a light source 202 from a predetermined angle, and the specular reflection light reflected by the measurement sample 201 is detected by a light receiver 203. The light receiver 203 detects tristimulus values XxYxZx in the International Commission on Illumination (CIE) XYZ color system. The degree how much the specular reflection light is colored is indicated as color saturation C*, which is expressed by a*b*h in the CIE L*a*b color system, based on a difference between the detected XxYxZx and tristimulus values XxYxZx of a sample that does not cause bronzing (for example, a black polished glass plate in which the wavelength dispersion of a reflective index is small). Less colored specular reflection light results in reduced C*, and C* becomes zero for a sample that does not cause coloring of specular reflection light (in other words, C* is positioned on the origin point on the a*b* plane).

Bronzing and thin-film interference are known as reasons that specular reflection light is colored as mentioned above.

Bronzing is a phenomenon that occurs due to the wavelength dependency of reflection on an interface of a formed image. It is known that each ink has a unique color to which the color of the ink is changed by a bronzing phenomenon. For example, specular reflection light is colored magenta in a region where an image is formed by a cyan ink. Japanese Patent Application Laid-Open No. 2008-236219 discusses that, when an image is formed on a recording medium using a plurality of recording materials, occurrence of bronzing is prevented by determining a recording order in which the color materials are laid, in such a manner that a recording material having smaller tristimulus values indicative of bronzing is overlaid on a recording material having larger tristimulus values.

However, according to the method discussed in Japanese Patent Application Laid-Open No. 2008-236219 it is impossible to completely overlay a color material on another color material in an image region using a color material having large tristimulus values indicative of bronzing more than a color material having small tristimulus values indicative of bronzing, and therefore, this method is less effective in such a case. Especially in a highly color-saturated image region, this ineffectiveness is more remarkable due to heavy use of a single recording material. In other words, this conventional method leaves much to be improved.

Another possible measure against coloring of specular reflection light is a method of using a clear ink, which is an ink containing no color material, as a recording material laid on the outermost surface of a recording medium, as illustrated in FIG. 1. A transparent clear ink has significantly small tristimulus values indicative of bronzing, and does not affect color development. Therefore, a clear ink can be used in any image region, and is expected to reduce coloring of specular reflection light more effectively.

However, this method results in a change in coloring of specular reflection light according to the discharge amount of a clear ink, since an optical path difference occurs in reflected light between an upper layer and a lower layer of a clear ink layer formed on a recording medium, and this optical path difference causes a thin-film interference.

This coloring of specular reflection light will be now described with reference to FIG. 3. FIG. 3 schematically illustrates the result of measuring the coloring of specular reflection light when a clear ink is laid on a solid surface formed by a cyan ink while changing the discharge amount of the clear ink with use of the method discussed in Japanese Patent Application Laid-Open No. 2006-177797, and then plotting the measured values on the a*b* plane. The numbers on the graph indicate the discharge amount of the clear ink. This graph shows that the coloring of specular reflection light reflected by the solid surface formed by the cyan ink is located in the magenta color phase, and the coloring is rotated in the clockwise direction on the a*b* plane according to an increase in the amount of the clear ink. In this way, this measurement has revealed that recording a clear ink on a color ink does not necessarily reduce coloring of specular reflection light, and coloring varies depending on the amount of a clear ink.

Further, coloring also varies depending on the type of a color ink laid under a clear ink. For example, coloring caused when a predetermined amount of a clear ink is overlaid on a solid surface formed by a cyan ink is different from coloring caused when the same amount of the clear ink is recorded on a solid surface formed by a magenta ink. In other words, just recording a predetermined amount of a clear ink on a color ink cannot completely reduce coloring in reflection on an interface between the color ink and the clear ink.

SUMMARY OF INVENTION

The present invention is directed to image processing capable of determining the discharge amount of a clear ink so as to comprehensively reduce coloring of specular reflection light.

According to an aspect of the present invention, an image processing apparatus is configured to convert image data into color material data including color material data indicating a color material amount of a chromatic color material and color material data indicating a color material amount of an achromatic color material. The image processing apparatus includes conversion means configured to convert image data of a pixel of interest into the color material data of the chromatic color material, determination means configured to determine the color material data of the achromatic color material on the pixel of interest based on coloring information corresponding to the converted color material data of the chromatic color material and coloring information that occurs at surrounding pixels of the pixel of interest, and calculation means configured to calculate coloring information that occurs at the pixel of interest based on coloring information corresponding to a combination of the converted color material data of the chromatic color material and the determined color material data of the achromatic color material and the coloring information that occurs at the surrounding pixels of the pixel of interest.

According to another aspect of the present invention, an image processing method, for converting image data into color material data including color material data indicating a color material amount of a chromatic color material and color material data indicating a color material amount of an achromatic color material, includes converting image data of a pixel of interest into the color material data of the chromatic color material, determining the color material data of the achromatic color material on the pixel of interest based on coloring information corresponding to the converted color material data of the chromatic color material and coloring information that occurs at surrounding pixels of the pixel of interest, and calculating coloring information that occurs at the pixel of interest based on coloring information corresponding to a combination of the converted color material data of the chromatic color material and the determined color material data of the achromatic color material and the coloring information that occurs at the surrounding pixels of the pixel of interest.

Further features and aspects of the present invention will become apparent from the following detailed description of exemplary embodiments with reference to the attached drawings.

BRIEF DESCRIPTION OF DRAWINGS

The accompanying drawings, which are incorporated in and constitute a part of the specification, illustrate exemplary embodiments, features, and aspects of the invention and, together with the description, serve to explain the principles of the invention.

FIG. 6 illustrates a specular reflection light coloring table according to the first exemplary embodiment.

FIG. 21 illustrates a specular reflection light coloring table according to the fifth exemplary embodiment.

FIG. 24 illustrates a specular reflection light coloring table according to the fifth exemplary embodiment.

DESCRIPTION OF EMBODIMENTS

Various exemplary embodiments, features, and aspects of the invention will be described in detail below with reference to the drawings.

In exemplary embodiments of the present invention, inks, which are used as recording materials, are expressed by the name of the color thereof such as cyan, magenta, yellow, black, clear (colorless or almost colorless ink), red, green, and blue. Colors, data of the colors, or the color phases of the colors are denoted by the initial thereof such as C, M, Y, K, CL, R, G, and B. More specifically, "C" represents the cyan color, data of the cyan color, or the color phase of the cyan color. Similarly, "M" represents magenta, "Y" represents yellow, "K" represents black, "R" represents red, "G" represents green, and "B" represents blue. "CL" represents colorless (transparent) color, or data thereof. Further, "coloring of specular reflection light" may be referred to as just "coloring" or "color". A value indicating coloring, such as an a*b* value in the CIE-L*a*b* color system, may be referred to as "coloring information".

As will be used herein, "area" is a smallest unit to which ON/OFF of a dot is defined. In connection of this definition, "image data" in color matching, color separation, and gamma correction, which will be described below, refers to a set of pixel data which is a processing target. Each pixel data indicates an 8-bit graduation value.

Further, "pixel data" in halftoning refers to pixel data which is a processing target itself. Halftoning converts pixel data containing an 8-bit gradation value as mentioned above into pixel data (index data) containing a 4-bit gradation value. In the following description, the term "pixel" is used to refer to the smallest constituent unit for which the discharge amount of a clear ink can be changed, unless otherwise indicated.

A first exemplary embodiment of the present invention employs a method developed by applying the error diffusion method used in halftoning as a method of determining a clear ink amount. Generally, the error diffusion method processes a pixel value as an error, while the first exemplary embodiment processes coloring of specular reflection light as an error.

Figure 1:
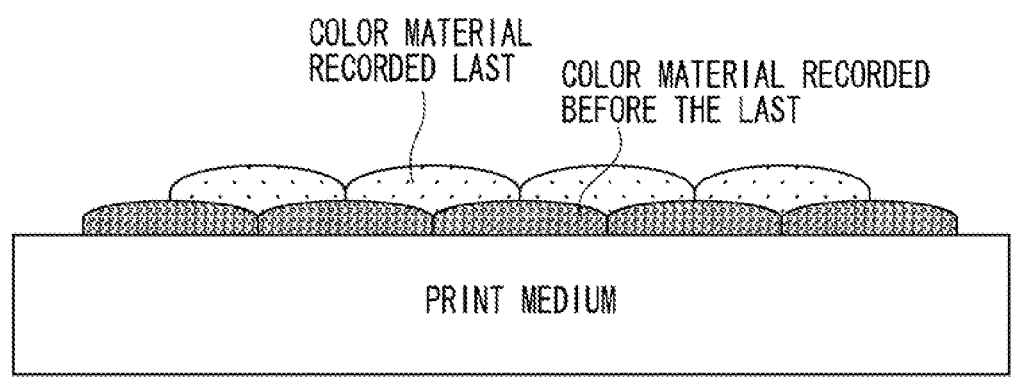
FIG. 1 schematically illustrates color materials deposited on a recording medium.
Figure 2:
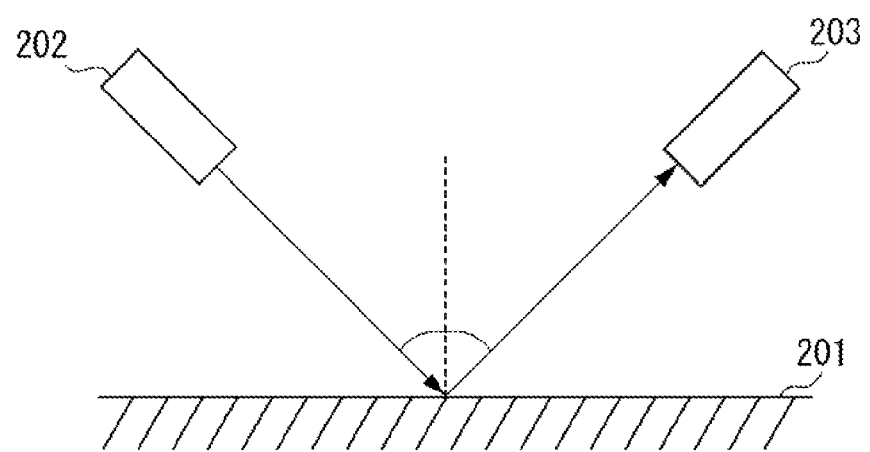
FIG. 2 illustrates a method of quantifying coloring of specular reflection light.
Figure 3:
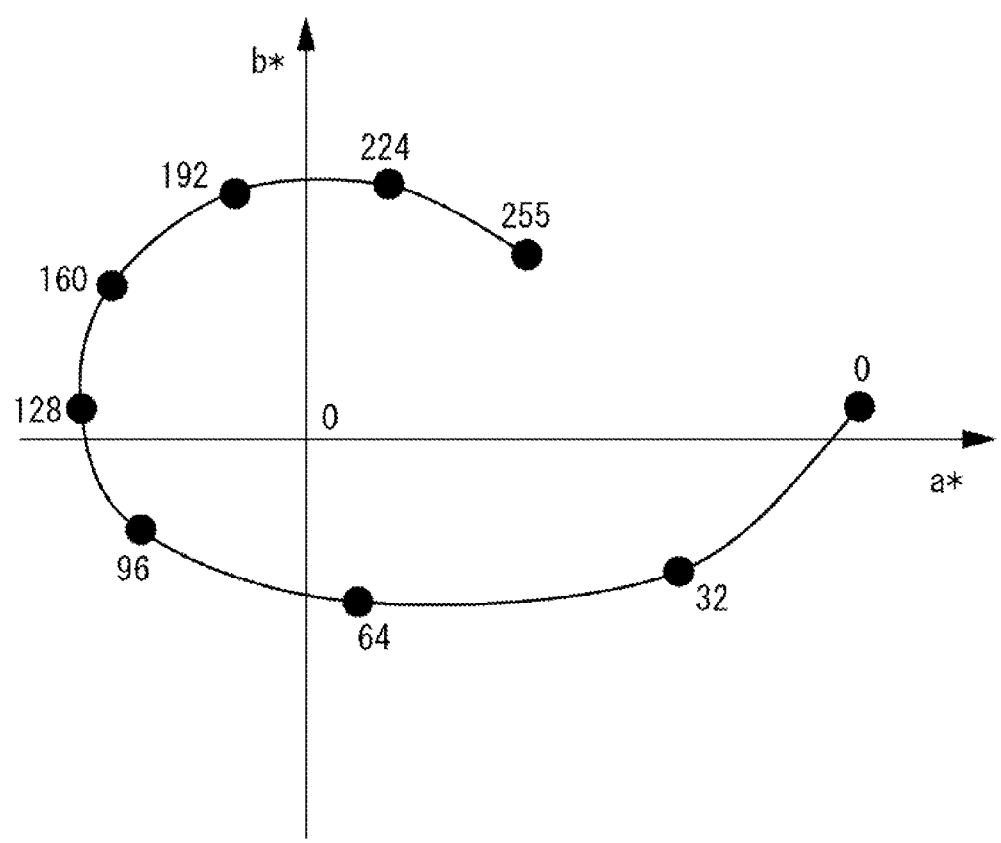
FIG. 3 schematically illustrates coloring of specular reflection light which is plotted on the a*b* plane.

Further, an image forming apparatus according to the first exemplary embodiment uses a clear ink, and forms such an image that the clear ink is overlaid on a color ink which is a chromatic color material. The term "overlay" means recording an image in such a manner that a certain ink is recorded on a recording medium as the last ink in a recording order, as illustrated in FIG. 1. The overlaying method may be any method capable of resulting in overlaying of a clear ink, although the present exemplary embodiment will be described based on an example using the method discussed in Japanese Patent Application Laid-Open No. 2008-162094.

Figure 4A:
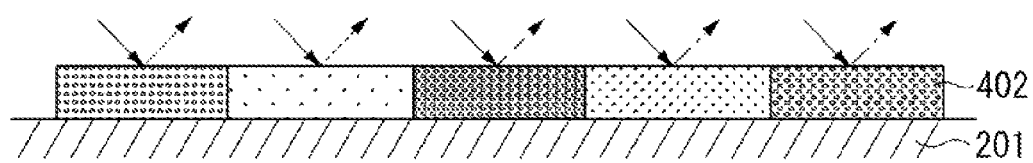
FIG. 4A illustrates a principle of a first exemplary embodiment of the present invention.
Figure 4B:
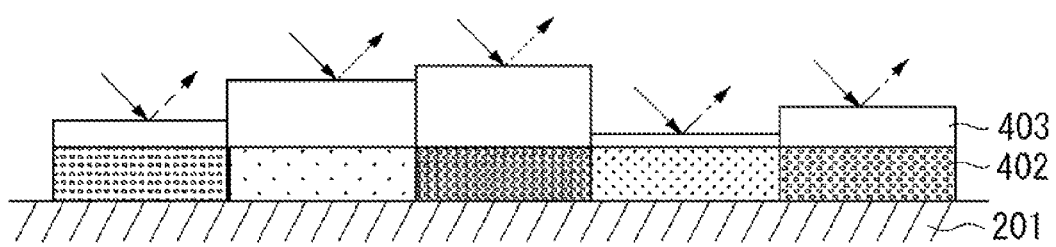
FIG. 4B illustrates the principle of the first exemplary embodiment of the present invention.

First, the principle of the first exemplary embodiment will be described. For convenience of description, the description will be given, with reference to a one-dimensional image having only one pixel in the longitudinal direction. However, the basic principle is also applicable to a two-dimensional image which is a commonly processed image. FIG. 4A schematically illustrates color materials deposited on a recording medium 201 when an image is formed using only color inks 402 without using a clear ink. On the other hand, FIG. 4B schematically illustrates image formation with a clear ink amount overlaid on each pixel. A different color ink 402 is deposited on each pixel on the recording medium 201, and coloring of specular reflection light occurs in a different manner on each pixel. A clear ink amount, which is color material data, is determined, starting from the leftmost pixel. First, as a clear ink amount for the leftmost pixel, a clear ink amount 403 is determined so as to maximally reduce coloring at that pixel based on coloring information acquired in advance. The coloring information indicates coloring when an overlaid clear ink amount is changed, with respect to each pixel value. The details of the coloring information will be described below.

When the coloring cannot be completely eliminated, i.e., the light does not become achromatic, a difference occurs between the coloring that occurs at the leftmost pixel, and achromatic coloring. This difference is diffused to the next pixel as an error in the error diffusion method. For example, if specular reflection light is colored green at a pixel with a predetermined amount of a clear ink overlaid thereon, red coloring is diffused to the next pixel as an error.

Next, a clear ink amount for the next pixel is determined so that actual coloring approaches the coloring diffused as an error. In the above-described example, a clear ink amount is determined so that the coloring approaches red at that pixel based on the coloring information acquired in advance. As in the above-described example, since green and red are complementary colors to each other, the global coloring looks achromatic when it is observed from a big-picture perspective, even though coloring locally occurs at each pixel when it is observed pixel by pixel. In other words, it is possible to reduce global coloring by determining a clear ink amount to be overlaid for each pixel in such a manner that the coloring phenomena at the respective pixels cancel out each other. Coloring of specular reflection light is expressed in two different manners, i.e., local coloring and global coloring, because coloring of specular reflection light depends on the observation scale. As will be used herein, "global coloring of specular reflection light" refers to coloring averaged in a scope wider than the scope that humans can resolve coloring of specular reflection light. On the other hand, "local coloring of specular reflection light" refers to coloring in several 10 micrometer order size in a scope that humans cannot resolve coloring of specular reflection light. In other words, a change in coloring minute more than the resolution of a human's eye is sensed as averaged coloring.

Further, when the coloring cannot be completely eliminated by the cancelling-out effect, a difference occurs between the coloring that occurs at the second pixel from left, and achromatic coloring. Sequential execution of the processing of diffusing such a difference to the next pixel as an error enables a reduction in the global coloring of specular reflection light.

Figure 5:
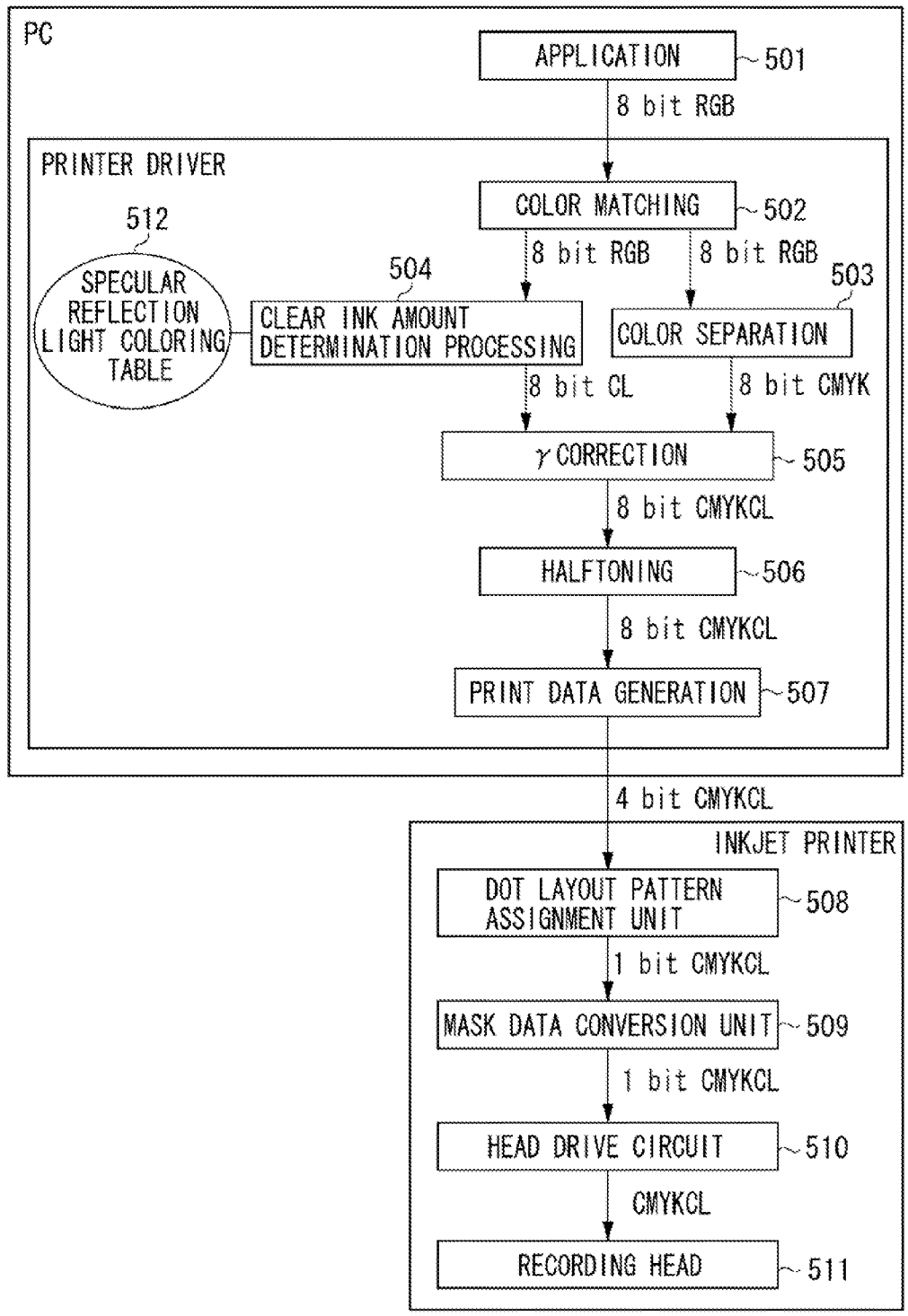
FIG. 5 is a block diagram illustrating a configuration of a printing system according to the first exemplary embodiment.

Next, the processing according to the first exemplary embodiment will be described in detail. FIG. 5 is a block diagram illustrating internal configurations of a host apparatus (personal computer (PC)) and an inkjet recording apparatus (inkjet printer) constituting a printing system according to the first exemplary embodiment. The inkjet printer is provided with a color ink containing pigment as a color material for each of four colors, cyan (C), magenta (M), and yellow (Y), which are basic colors, and black (K). Further, the inkjet printer is provided with a clear ink (CL) which is a colorless (transparent) ink, in addition to these four colors. The inkjet printer prints data by using the inks of these five colors in total. Therefore, the inkjet printer includes a recording head 511 for discharging the inks of these five colors.

An application and a printer driver are provided as programs which operate under an operating system on the PC. The application 501 performs the processing for generating image data to be printed by the printer. This image data, or previous data, for example, before being edited can be introduced into the PC via various kinds of media. The PC can acquire image data captured by a digital, camera, which is, for example, in the Joint Photographic Experts Group (JPEG) format, via a compact flash (CF) card. Further, the PC can also acquire image data scanned by a scanner, which is, for example, in the Tag Image File Format (TIFF) format, and image data stored in a compact disc read only memory (CD-ROM). Further, the PC can also acquire image data on a web site via the Internet. These acquired pieces of image data are displayed on a monitor of the PC, and for example, is edited and processed via the application 501. After that, the image data is converted into, for example, Red Green Blue (RGB) image data expressed by R, G, and B signals under Standard Red. Green Blue (sRGB). Then, this RGB image data is supplied to the printer driver according to a print instruction.

The printer driver performs various kinds of processing, i.e., color matching 502, color separation 503, clear ink amount determination 504, gamma correction 505, halftoning 506, and print data generation 507.

The color matching 502 performs gamut mapping. The color matching 502 uses a three-dimensional look-tip table (LUT) to map the gamut reproduced by R, G, and B signals under the sRGB standard into the gamut reproduced by the inkjet printer. Then, the color matching 502 uses this LUT and interpolation calculation to perform a data conversion for converting 8-bit RGB data to RGB data in the gamut of the printer.

The color separation 503 converts RGB data into color separation data (CMYK data) corresponding to the combination of inks that can reproduce the color indicated by the RGB data, based on the RGB data after the gamut mapping. This processing is performed by using interpolation calculation in addition to a three-dimensional LUT, similarly to the color matching. The output thereof is 8-bit data for each color, and uses a value corresponding to a color material amount of each color material of C, M, Y, and K.

The clear ink amount determination processing 504 determines a clear ink amount to be overlaid on each pixel by referring to a specular reflection light coloring table 512. The details thereof will be described below.

The gamma correction 505 applies a gradation value conversion to data of each color in the color separation data acquired by the color separation 503 and the clear ink amount determination processing 504. More specifically, the gamma correction 505 performs such a conversion that the color separation data linearly corresponds to the gradation characteristic of the inkjet printer by using a one-dimensional LUT according to the gradation characteristic of each color ink of the inkjet printer. The clear ink is transparent, and therefore the gamma correction is not applied to the color material amount of the clear ink.

The halftoning 506 performs quantization for converting each signal of the C, M, Y, K, and CL signals of the 8-bit color separation data (CMYKCL data) into 4-bit image data. In the present exemplary embodiment, 8-bit data is converted into and output as 4-bit data with use of the error diffusion method. This 4-bit image data is index data indicating a layout pattern in dot layout pattern assignment processing in the inkjet printer. The quantization is not limited to the error diffusion method, and may be performed by, for example, the threshold value processing with use of a dither matrix. Alternatively, the quantization may be performed by establishing a relationship among the respective C, M, Y, K, and CL signals.

Finally, the print data generation 507 generates print data by adding print control information to print data containing the 4-bit index data.

The above-described kinds of processing of the application 501 and the printer driver are executed by a central processing unit (CPU) according to the programs thereof. At this time, the CPU reads the programs from a read only memory (ROM) or a hard disk to use them. The CPU uses a random access memory (RAM) as a work area when executing the processing.

The inkjet printer includes a dot layout pattern assignment unit 508, a mask data conversion unit 509, a head drive circuit 510, and a recording head 511.

The dot layout pattern assignment unit 508 determines a dot layout for each pixel corresponding to an actual print image, according to a dot layout pattern corresponding to 4-bit index data (gradation value information) which is print image data. The above-described halftoning 506 reduces the level number of multivalued density information of 256 values (8-bit data) to gradation value information of 9 values (4-bit data). However, information that the inkjet printer can actually record is only two values information indicating whether to record an ink or not. The dot layout pattern assignment unit 508 assigns a dot layout pattern corresponding to a gradation value (level 0 to 8) of a pixel to each pixel expressed by 4-bit data indicating level 0 to 8, which is an output value from the halftoning 506. This assignment defines ON/OFF of a dot for each of a plurality of areas in one pixel. In other words, whether a dot is generated is defined for each of the plurality of areas in one pixel, and two-value discharge data, i.e., "1" or "0" is set to each area in one pixel.

The mask data conversion unit 509 applies mask processing to 1-bit discharge data acquired from the dot layout pattern assignment. In other words, the mask conversion unit 509 generates discharge data of each scanning so that the recording head 511 can complete recording on a scanning region having a predetermined width by a plurality of scanning processes. At this time, the mask data conversion unit 509 applies mask processing so that the clear ink is discharged during the last scanning of the plurality of scanning processes. In other words, the mask data conversion unit 509 generates discharge data causing the clear ink to be laid on the outermost surface on a paper relative to the other inks. The details of the mask processing will be described below.

Discharge data C, M, Y, K, and CL for each scanning is transmitted to the head drive circuit 510 at appropriate timing, whereby the recording head 511 is driven to discharge each ink according to the discharge data.

The above-described dot pattern assignment unit 508 and the mask data conversion unit 509 in the inkjet printer are executed under control of a CPU, which constitutes a not-shown control unit, with use of a hardware circuit dedicated to each of them. These kinds of processing may be performed by the CPU according to programs, or may be performed by, for example, a printer driver in the PC.

The halftoning 506 and the print data generation 507 have been described assuming that they are performed by the printer driver installed in the PC, but the present exemplary embodiment is not limited thereto. The system may be configured in such a manner that the halftoning is performed in the printer.

Next, each processing according to the present exemplary embodiment will be described in further detail. The present exemplary embodiment determines a clear ink amount by referring to the specular reflection light coloring table and using the method developed by applying the error diffusion method. The specular reflection light coloring table is a table indicating the relationship between the clear ink amount and coloring of specular reflection light. First, the specular reflection light coloring table will be described, and then the clear ink amount determination processing will be described.

The specular reflection light coloring table stores required data so that coloring of specular reflection light when the clear ink amount is changed for each RGB value can be acquired as an a*b* value in the CIE*L*a*b color system. FIG. 6 illustrates specific contents of the stored data. Referring to FIG. 6, the first to third columns contain the respective RGB values, the fourth column contain the ink value of the clear ink, and the fifth and sixth columns contain the values of a* and b*, as which coloring of specular reflection light is expressed in the L*a*b* color system.

Specular reflection light coloring data expressed by the values of a* and b* can be acquired by printing a patch image reproduced by a combination of an RGB value and an ink value of the clear ink on a recording medium, and measuring the coloring by a measurement apparatus. Although FIG. 6 illustrates an example of a table containing specular reflection light coloring data corresponding to 8 gradation values each incremented by 32 levels as the ink values of the clear ink, the number of bits of the ink values of the clear ink is not limited thereto. When the RGB values are gradation values of 256 levels for each color, specular reflection light coloring data is required for each of combinations (256×256×256×8=134217728). These combinations are enormous as a total, and therefore take a lot of measurement time and occupy a significant data amount.

Therefore, the present exemplary embodiment utilizes tetrahedron interpolation with use of eight pieces of specular reflection light coloring data, and obtains the other pieces of specular reflection light coloring data by an interpolation calculation. The interpolation method may be, for example, cubic interpolation. Specular reflection light coloring data is not limited to data corresponding gradation values at a same interval for each RGB value, and may be measured at variable intervals.

Further, the specular reflection light coloring table is not limited to the above described structure, and may have any structure that can relate combinations constituted by the signal values of the input color signals and the ink values of the clear ink to coloring of specular reflection light. Further, the input signals may be CMYK values, and may be switched between the RGB values and the CMYK values automatically or according to a mode specified by a user.

Figure 7:
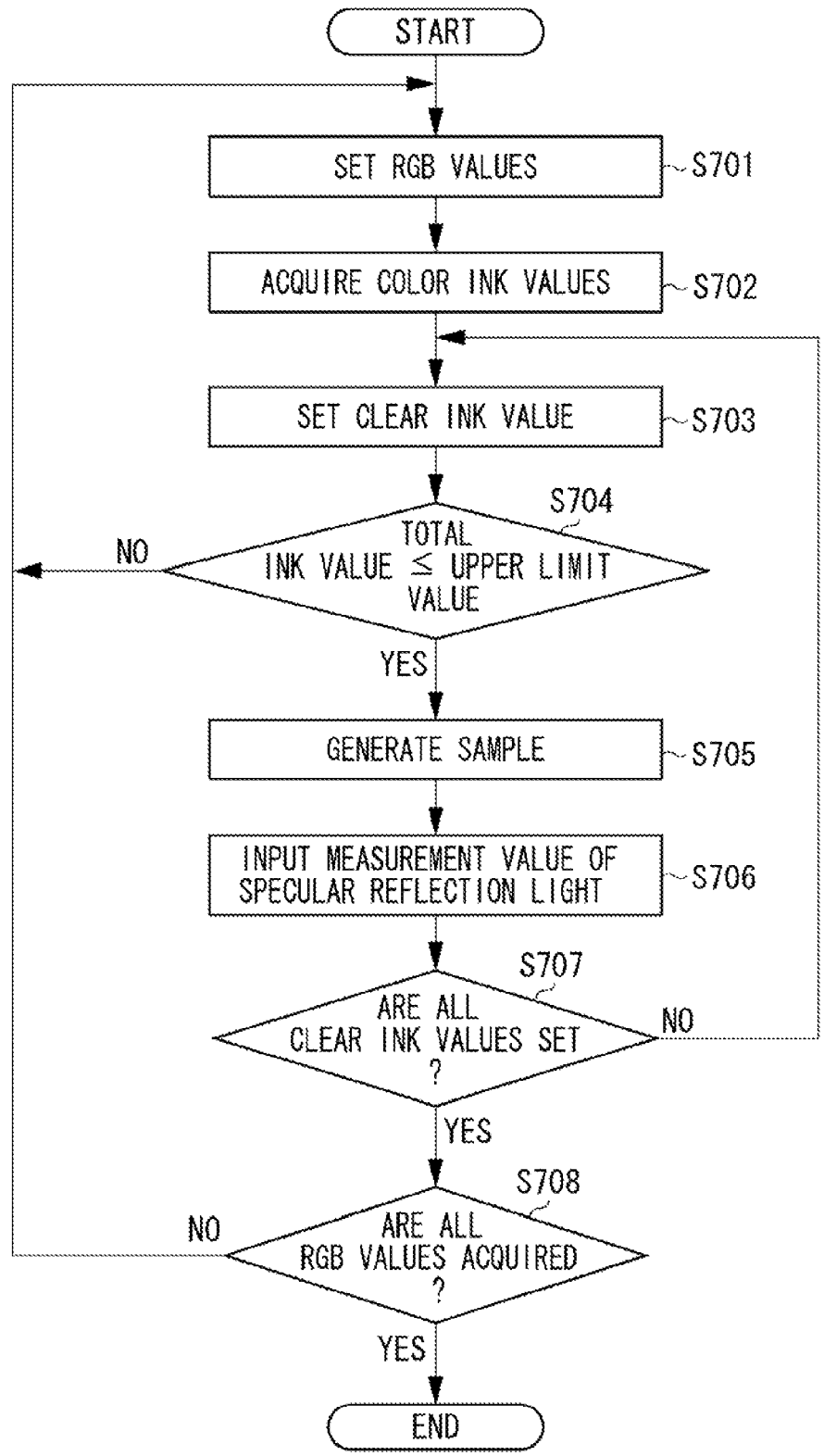
FIG. 7 is a flowchart illustrating processing of generating the specular reflection light coloring table.

FIG. 7 is a flowchart illustrating processing of generating the specular reflection light coloring table. In step S701, the CPU sequentially sets the RGB values corresponding to the first to third columns illustrated in FIG. 6. In step S702, the CPU acquires the ink value of the color ink required to form the image indicated by the RGB value set in step S701. More specifically, the CPU acquires the CMYK data, which can be obtained by the color separation 503 illustrated in FIG. 5, from the set RGB value. In step S703, the CPU sets the ink value of the clear ink corresponding to the fourth column illustrated in FIG. 6 from a small value to a large value in ascending order. In step S704, the CPU determines whether a total amount of the color ink amount indicated by the ink value of the color ink, and the clear ink amount indicated by the ink value of the clear ink exceeds a predetermined upper limit value for the recording medium. The upper limit value is set because there is a limitation to an ink amount that a receiver layer of a recording medium can hold. In case that the total ink amount is more than the upper limit value (NO in step S704), the CPU sets the next RGB value. In case that the total ink amount is equal to or less than the upper limit value (YES in step S704), the processing proceeds to step S705, in which the CPU generates patch image data with use of the ink values acquired by the above-described steps, and causes the inkjet printer to print the generated patch image data. In step S706, the CPU inputs a measurement value acquired by measuring the coloring of specular reflection light reflected on the printed patch image. In step S707, the CPU determines whether the CPU sets all of the ink values of the clear ink corresponding to the fourth column illustrated in FIG. 6. In case that there is any ink value left to be set (NO in step S707), the CPU repeats step S703 and the steps thereafter with a changed (increased) clear ink amount. In case that the CPU sets all of the ink values (YES in step S707), the processing proceeds to step S708. Execution of these steps enables acquisition of specular reflection light coloring data when the ink value of the clear ink is changed for a certain RGB value. Next, in step S708, the CPU determines whether the CPU sets all of the RGB values, which are set in the step S701. In case that there is any RGB value left to be set (NO in step S708), the CPU repeats step S701 and the steps thereafter after setting the next RGB value. In case that the CPU sets all of the RGB values that should be measured (YES in step S708), the CPU stores the acquired specular reflection light coloring data in the specular reflection light coloring table in such a manner that the data is related to the respective RGB values. Then, the processing is ended.

Execution of the above-described steps enables acquisition of the specular reflection light coloring table when the ink value of the clear ink is changed for all of the RGB values.

Next, the clear ink amount determination processing will be described. The processing is executed by controlling local coloring of specular reflection light on an image, and causing global coloring of specular reflection light within a range enabling an additive color mixture of local coloring of specular reflection light.

Figure 8:
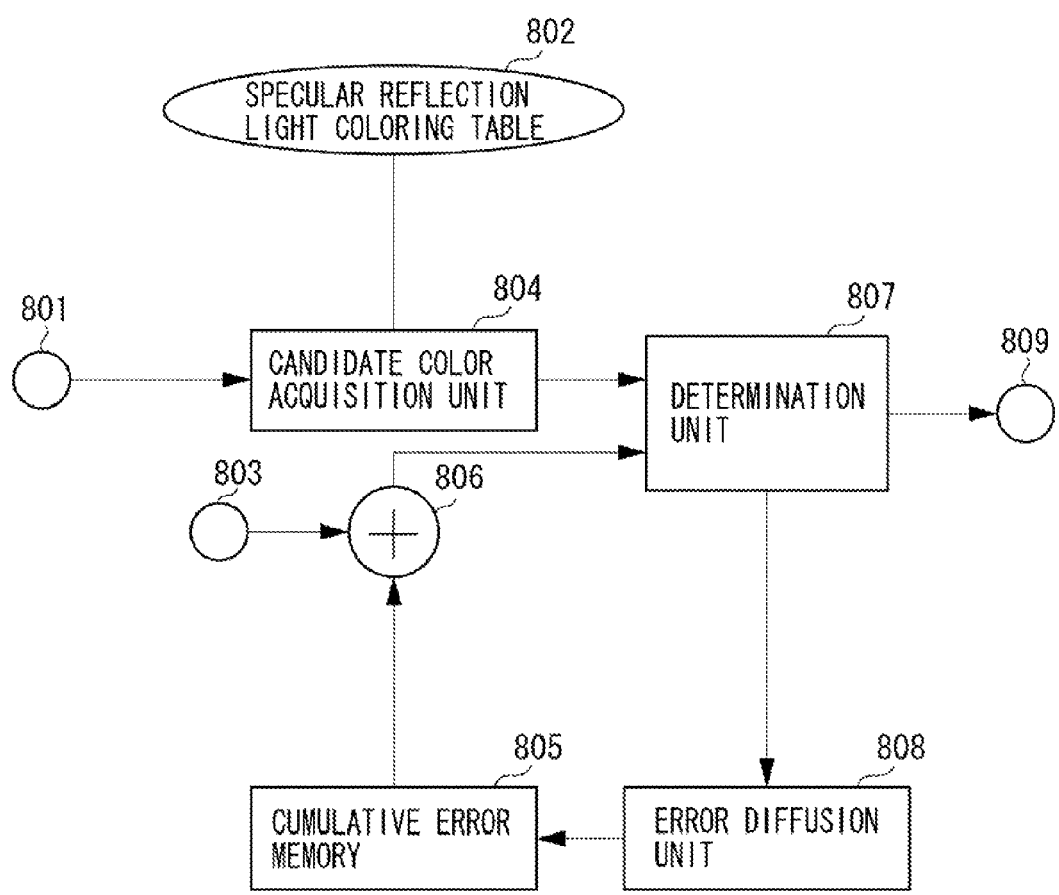
FIG. 8 is a block diagram illustrating a functional configuration of clear ink amount determination processing according to the first exemplary embodiment.

FIG. 8 is a block diagram illustrating a functional configuration of the clear ink amount determination processing 504. An input unit 801 selects pixel data of a target pixel to be processed one by one from image data constituted by an array of a plurality of pixels, and inputs input pixel data. The specular reflection light coloring table 802 retains the above-described the specular reflection light coloring table. A target data input unit 803 inputs target data. A candidate color acquisition unit 804 acquires candidate colors for coloring of specular reflection light that can be realized at a target pixel. A cumulative error memory 805 stores a cumulative error. An addition unit 806 adds the cumulative error stored in the cumulative error memory 805 to the target data. A determination unit 807 determines coloring to be realized at the target pixel from the candidate colors acquired by the candidate color acquisition unit 804, and identifies a clear ink amount required for the determined coloring. An error diffusion unit 808 diffuses a coloring error to a pixel in the vicinity of a target pixel. An output unit 809 outputs, to the gamma correction processing 505, the determined clear ink amount as output data one by one for each pixel, or collectively for all pixels.

Figure 9:
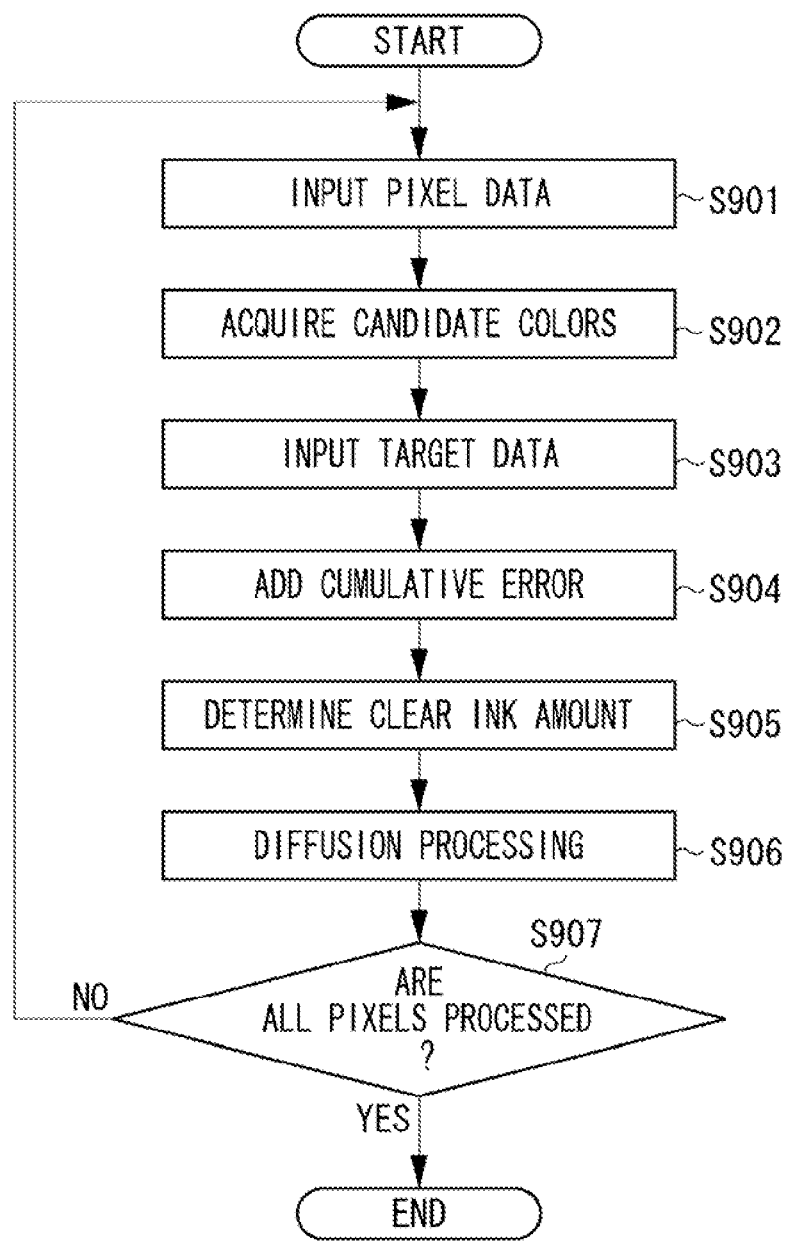
FIG. 9 is a flowchart illustrating the clear ink amount determination processing according to the first exemplary embodiment.

FIG. 9 is a flowchart illustrating an operation of the clear ink amount determination processing 504 illustrated in FIG. 8. The clear ink determination processing is first started with an uppermost and leftmost pixel on an image as a target pixel, and then is continued while switching the target pixel to the right pixel one by one. After the processing of an uppermost and rightmost pixel, the target pixel is then shifted to a leftmost pixel on a next pixel row below. The processing is continued in this order, and is ended with the processing of a lowermost and rightmost pixel on the image.

Upon a start of the processing, in step S901, the input unit 801 inputs pixel data of a target pixel.

In step 902, the candidate color acquisition unit 804 refers to the specular reflection light coloring table 802 for the data corresponding to the input pixel data, acquires eight pieces of data (ai*, bi*) (i=1 to 8) of candidate colors for the coloring of specular reflection light, and outputs them to the determination unit 807. The eight candidate colors have different clear ink amounts with respect to a same RGB value.

Then, in step S903, one piece of target data (at*, bt*) is input. In the present exemplary embodiment, the values of the target data are set as (at*=0, bt*=0) regardless of the pixel, so as to reduce global coloring of specular reflection light.

Next, in step S904, the addition unit 806 adds, to the target data, one cumulative error (as*, bs*) corresponding to the pixel position of the target pixel, which is stored in the cumulative error memory 805, by using the following equation.

$$at^* \leftarrow at^* + as^*, bt^* \leftarrow bt^* + bs^* \quad [\text{Math. 1}]$$

The arrows in the above equation represent substitution. Assuming that x is the horizontal pixel position of the pixel data of a target pixel, the cumulative error memory 805 includes one storage area (Sa0, Sb0) and w storage areas (Sa(x), Sb(x)) (x=integer of 1 to W). Each storage area stores an error (as*, bs*) to be applied to a target pixel. The value of a cumulative error is acquired by a method that will be described below. At the onset of the processing, all of the storage areas are initialized to an initial value (Sa(x)=0, Sb(x)=t).

Next, the determination unit 807 calculates color differences between the a*b* values of the eight candidate colors, and the target data with the cumulative error added thereto. The color difference is calculated by the following equation.

$$\sqrt{((at^* - ai^*)^2 + (bt^* - bi^*))} (i=1 \text{ to } 8) \quad [\text{Math. 2}]$$

In step 905, the determination unit 807 identifies the candidate color (ai*, bi*) that has the smallest color difference by this equation, determines the clear ink amount corresponding to the identified candidate color, and outputs the determined clear ink amount to the output unit 809. The determination unit 807 outputs Sa=at*−ai* and Sb=bt*−bi*, which is an error of this candidate color, to the error diffusion unit 808. For example, when coloring that occurs at a target pixel is green, the error thereto (coloring to be diffused) is red. The candidate color is not limited to a color having a smallest color difference, and may be a color having a small color difference. Further, in the above description, an error is calculated by subtracting coloring of a candidate color from target data. However, the error calculation is not limited to this method, and may be performed by subtracting target data from a candidate color.

Then, the error diffusion unit 808 performs the following error diffusion processing according to the horizontal position of the target pixel in the image. That is, the error diffusion unit 808 calculates an error to be stored in the storage area S0 and S(x) according to the following equation, and stores it in the cumulative error memory 805.

$$(Sa(x+1), Sb(x+1)) \leftarrow (Sa(x+1) + Sa \times \tfrac{7}{16}, Sb(x+1) + Sb \times \tfrac{7}{16})(x<W)$$

$$(Sa(x-1), Sb(x-1)) \leftarrow (Sa(x-1) + Sa \times \tfrac{3}{16}, Sb(x-1) + Sb \times \tfrac{3}{16})(x>1)$$

$$(Sa(x), Sb(x)) \leftarrow (Sa0 + Sa \times \tfrac{5}{16}, Sb0 + Sb \times \tfrac{5}{16})(1<x<W)$$

$$Sa(x), Sb(x)) \leftarrow (Sa0 + Sa \times \tfrac{8}{16}, Sb0 + Sb \times \tfrac{8}{16})(x=1)$$

$$(Sa(x), Sb(x)) \leftarrow (Sa0 + Sa \times \tfrac{13}{16}, Sb0 + Sb \times \tfrac{13}{16})(x=W)$$

$$(Sa0(x), Sb0(x)) \leftarrow (Sa \times \tfrac{1}{16}, Sb \times \tfrac{1}{16})(x<W)$$

$$(Sa0(x), Sb0(x)) \leftarrow (0,0)(x=W) \quad [\text{Math. 3}]$$

In this way, in step S906, the error diffusion processing for one pixel is completed.

Lastly, in step S907, it is determined whether steps S901 to S906 are applied to all of the pixels in the image. In case that there is any pixel that the steps are not yet applied (NO in step S907), the processing returns to step S901, while in case that the steps are applied to all of the pixels (YES in step S907), the clear ink amount determination processing is ended.

The mask data conversion unit 509 converts discharge data for one bit which is generated by the dot layout pattern assignment unit 508 into discharge data for each scanning.

Whether dot is ON or OFF in each area on a recording medium is already determined by the processing of the dot layout pattern assignment unit 508, and, therefore, a desired image can be recorded on the recording medium by inputting the generated binary discharge data even without any conversion into the drive circuit of the recording head 511. However, the inkjet recording apparatus employs the multipass recording method to reduce deterioration of an image quality that may be caused due to, for example, a variation among ink droplet discharge characteristics of individual nozzles and a variation in the accuracy of conveying a recording medium. Therefore, the multipass recording in the present exemplary embodiment will be described below.

Figure 10:
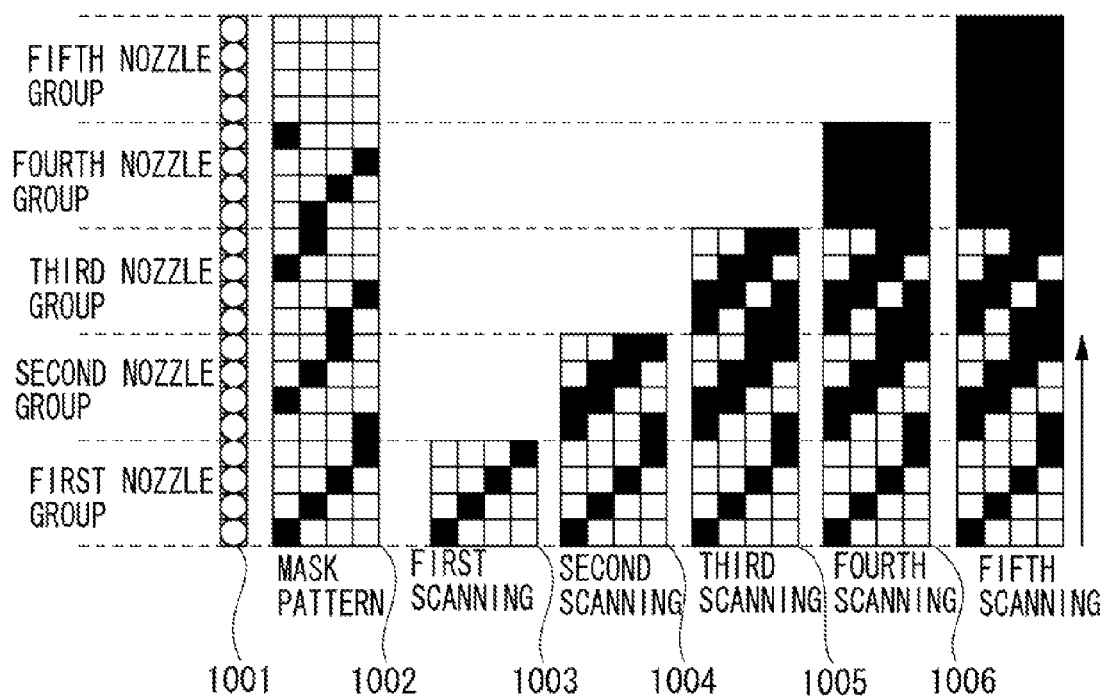
FIG. 10 illustrates multipass recording of color inks.

A method of recording the color inks by the multipass method will be described with reference to FIG. 10. FIG. 10 schematically illustrates a recording head and a recording pattern. The recording head 1001 is divided into five nozzle groups, the first nozzle group to the fifth nozzle group. Each nozzle group includes four nozzles. In a mask pattern 1002, the black blocks indicate an area to be recorded by each nozzle. In color ink recording, the mask pattern corresponding to the fifth nozzle group is white as a whole, which means that the fifth nozzle group records nothing. The recording head 1001 is configured in such a manner that the patterns recorded by the respective nozzle groups are in a complementary relationship to one another, and overlaying all of the patterns of the first to fourth nozzle groups results in a completion of recording on a region corresponding to 4×4 areas.

The respective patterns 1003 to 1006 illustrate the process during which an image is being completed by repeating a scanning operation. Each time scanning of each nozzle group is completed, the recording medium is conveyed by a distance corresponding to the width of the nozzle group in the direction indicated by the arrow in FIG. 10. Therefore, execution of four times of scanning finally completes recording of an image with color inks on a predetermined recording region (a region corresponding to the width of each nozzle group) of the recording medium. In the present exemplary embodiment, the term "the number of passes" is used to refer to the number of times of scanning required to complete an image on the predetermined recording region. In this way, forming a predetermined recording region by a plurality of times of scanning performed by a plurality of nozzle groups is beneficial in reducing deterioration of an image quality which might be caused due to, for example, a variation among individual nozzles and a variation in the accuracy of conveying a recording medium.

Figure 11:
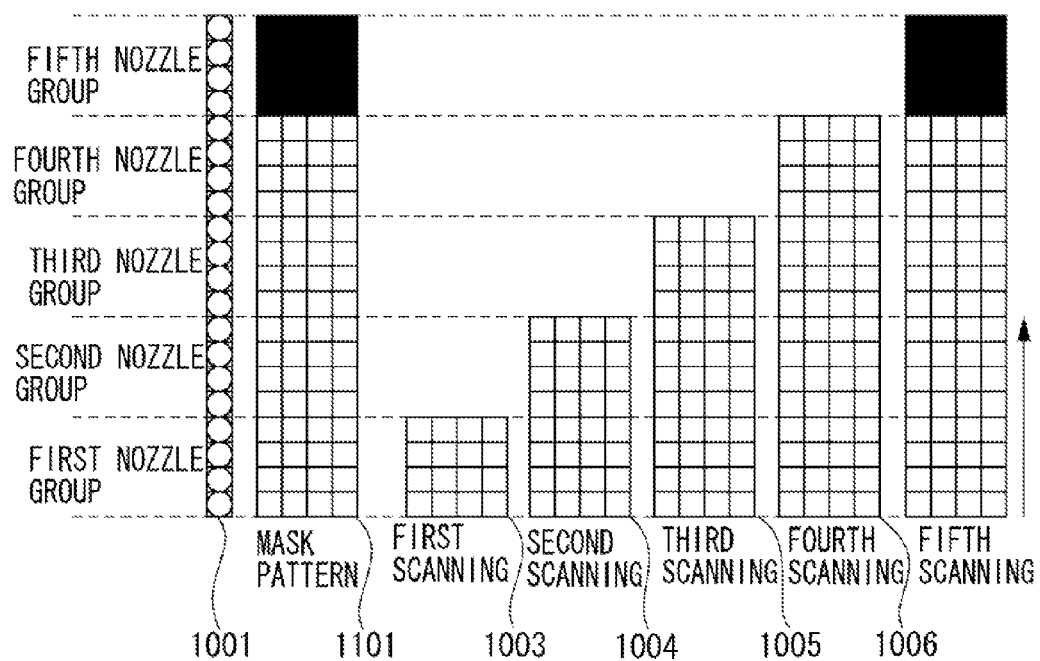
FIG. 11 illustrates multipass recording of a clear ink.

A method of recording the clear ink by the multipass method will be described with reference to FIG. 11. FIG. 11 schematically illustrates a recording head and a recording pattern. The clear ink is recorded by scanning of the fifth nozzle group, which is not used in the color ink recording, according to a mask pattern 1101. The present exemplary embodiment is described based on an example of recording the clear ink by the last one time of scanning. However, the mask pattern for recording the clear ink is not limited thereto, and may be any mask pattern capable of recoding the clear ink on the outermost surface of a recording medium. For example, the inkjet printer may further include a sixth nozzle group, and use a mask pattern for recording the clear ink by a plurality of limes of scanning.

The mask data conversion unit 509 generates mask data for each ink by performing a logical AND (logical multiplication) between 1-bit discharge data generated by the dot layout pattern assignment unit 508, and the mask pattern 1002 illustrated in FIG. 10 and the mask pattern 1101 illustrated in FIG. 11. Generation of mask data in this way leads to such recording that the clear ink is laid on the uppermost layer on a recording medium, thereby enabling overlaying of the clear ink.

As described above, according to the present exemplary embodiment, it is possible to reduce coloring of specular reflection light by determining a clear ink amount to be overlaid on each pixel so as to reduce global coloring of specular reflection light on an image.

As the first exemplary embodiment, the method of reducing global coloring of specular reflection light has been described. However, the method according to the first exemplary embodiment may cause coloring recognizable when an image is studied from up close. This is because the clear ink amount is determined so that coloring in a whole image becomes comprehensively achromatic. In other words, an error (coloring) that occurs at a certain pixel is subsequently cumulated, and the cumulated error is released in a region away from the region where the pixel exits.

Therefore, as a second exemplary embodiment of the present invention, a description will be given of a method in which an upper limit is set to accumulation of an error so as to prevent an error that occurs at a certain pixel from being released in a distant region. The second exemplary embodiment will be briefly described, mainly focusing on differences from the first exemplary embodiment.

Figure 12:
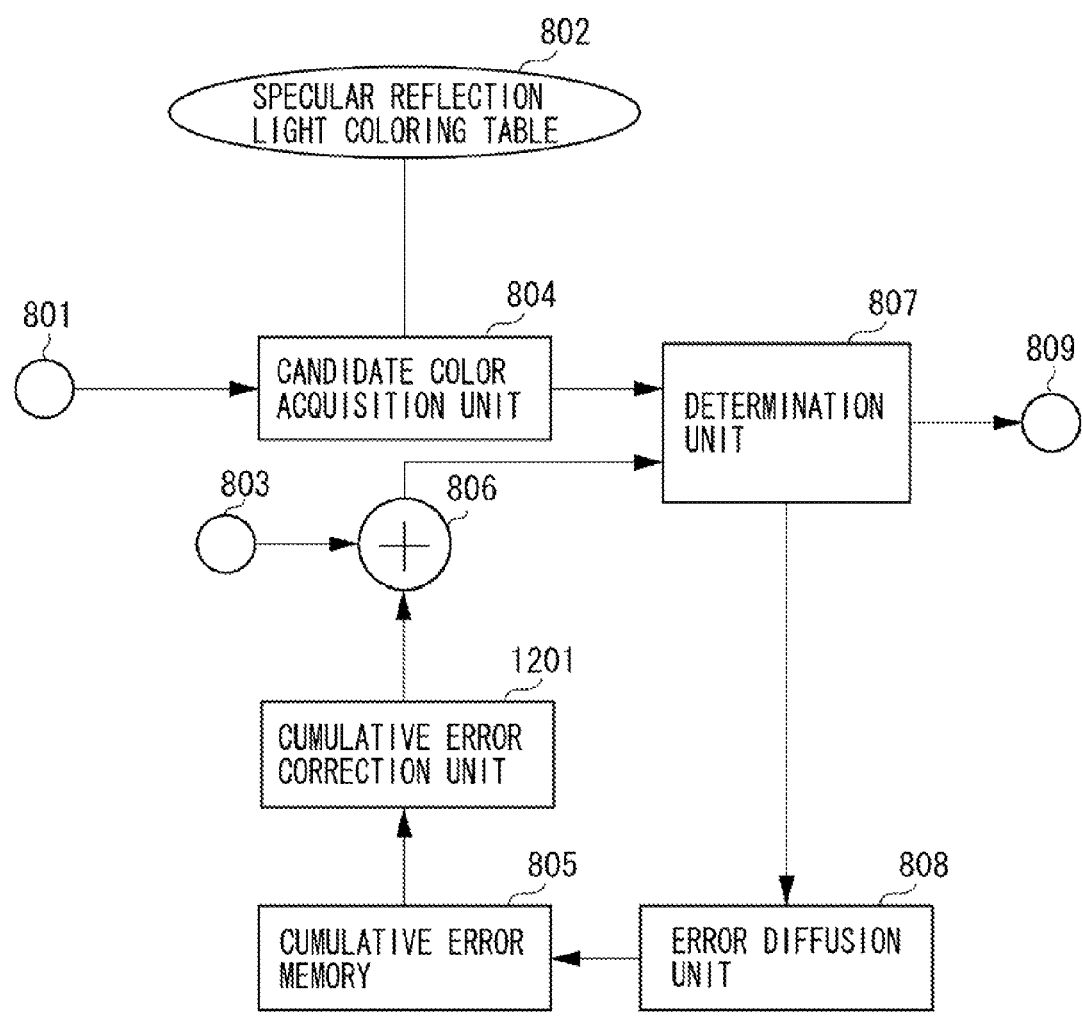
FIG. 12 is a block diagram illustrating a functional configuration of clear ink amount determination processing according to a second exemplary embodiment of the present invention.

FIG. 12 is a block diagram illustrating a functional configuration of the clear ink amount determination processing 504 according to the second exemplary embodiment. The second exemplary embodiment includes a cumulative error correction unit 1201 between the cumulative error memory 805 and the addition unit 806 illustrated in FIG. 8. The cumulative error correction unit 1201 corrects an error calculated by the cumulative error memory 805 based on a predetermined limit value set in advance as an upper limit of an error. The limit value is set as, for example, amax*=100, bmax*=100. However, the limit value is not limited to 100, and may be determined in consideration of the degree of accumulation of an error.

Figure 13:
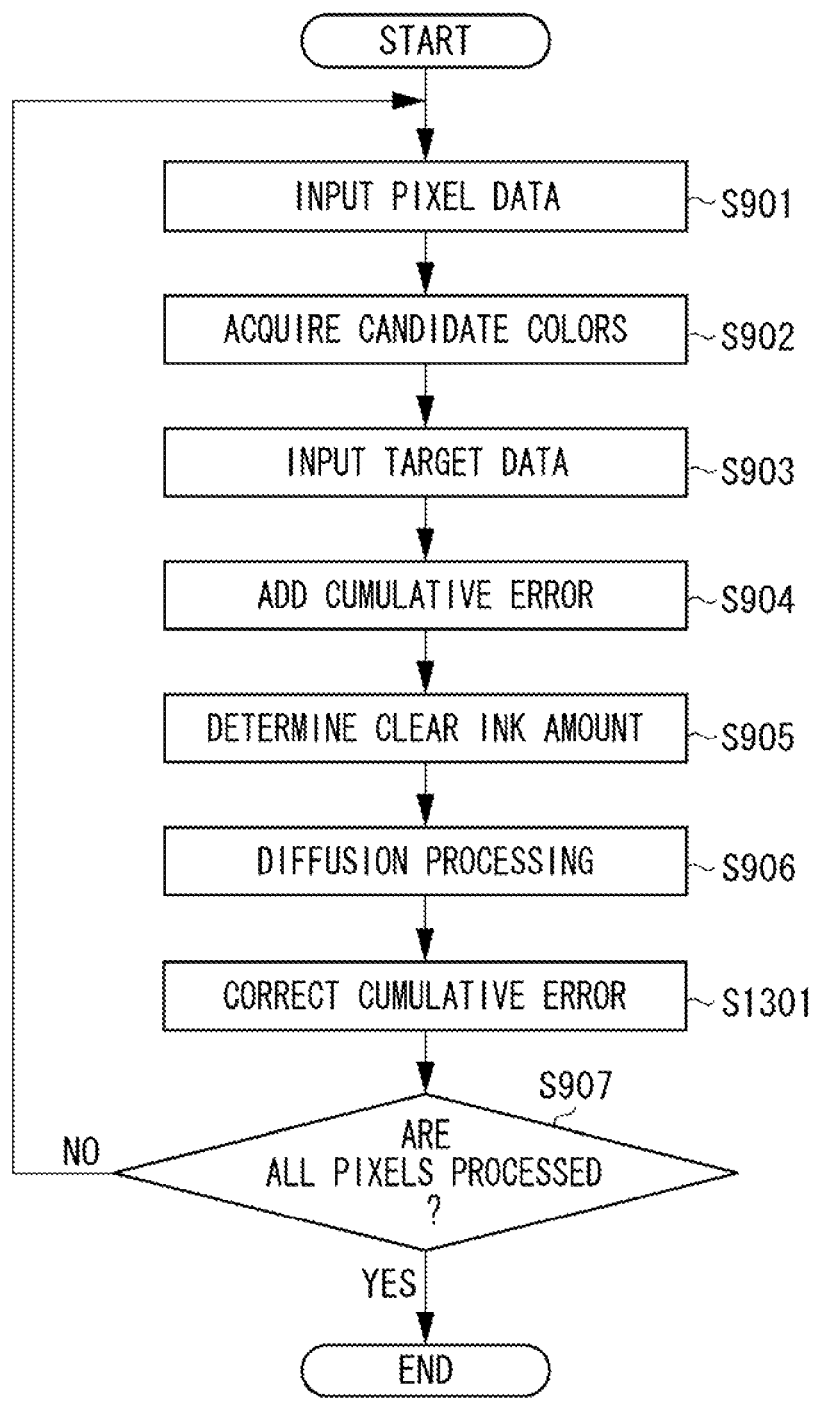
FIG. 13 is a flowchart illustrating the clear ink amount determination processing according to the second exemplary embodiment.

FIG. 13 is a flowchart illustrating clear ink amount determination processing according to the second exemplary embodiment. The steps other than cumulative error correction are the same as the steps in the flowchart of FIG. 9 according to the first exemplary embodiment, and, therefore, the descriptions thereof will be omitted. In step S1301, in case that the a* value, which is an error input from the diffusion processing in step S906, is equal to or smaller than amax* (a*< or =amax*), the a* value is not corrected. On the other hand, in case that the a* value is larger than amax* (a*>amax*), the a* value is corrected to zero. The same correction is also applied to the b* value.

In step S907, it is determined whether steps S901 to S906 are performed on all of the pixels in the image. In case that there is any pixel left to be processed (NO in step S907) the processing returns to step S901. On the other hand, in case that all of the pixels are processed (YES in step S907), the clear ink amount determination processing is ended.

According to the above-described processing, the data stored in the cumulative error memory 805 is initialized to zero, in case that it exceeds the upper limit. As a result, it is possible to prevent an error that occurs at a certain pixel from being released in a distant region.

The second exemplary embodiment has been described based on an example in which the data stored in the cumulative error memory 805 exceeds the upper limit. However, another method may be used to prevent an error from being released in a distant region. For example, an upper limit is determined to the number of times of cumulating errors into the cumulative error memory 805, and the number of times of accumulation is counted. When the counted number of times of accumulation exceeds the upper limit, the a* value and the b* value are corrected to zero. The range of a position to which an error is diffused may be limited in this way.

The method aiming at a global reduction in coloring that occurs at each pixel has been described as the first and second exemplary embodiments. As a third exemplary embodiment of the present invention, a description will be given of a method of determining a clear ink amount so as to make coloring most inconspicuous at each pixel, i.e., make coloring most achromatic.

As mentioned above, coloring that occurs when a clear ink is overlaid on an color ink varies depending on an overlaid amount of the clear ink. In other words, a certain clear ink amount generates a condition minimizing the degree of coloring. Therefore, in case that coloring at each pixel is made inconspicuous, global coloring can be also reduced. The third exemplary embodiment will be briefly described, mainly focusing on differences from the above-described exemplary embodiments.

Figure 14:
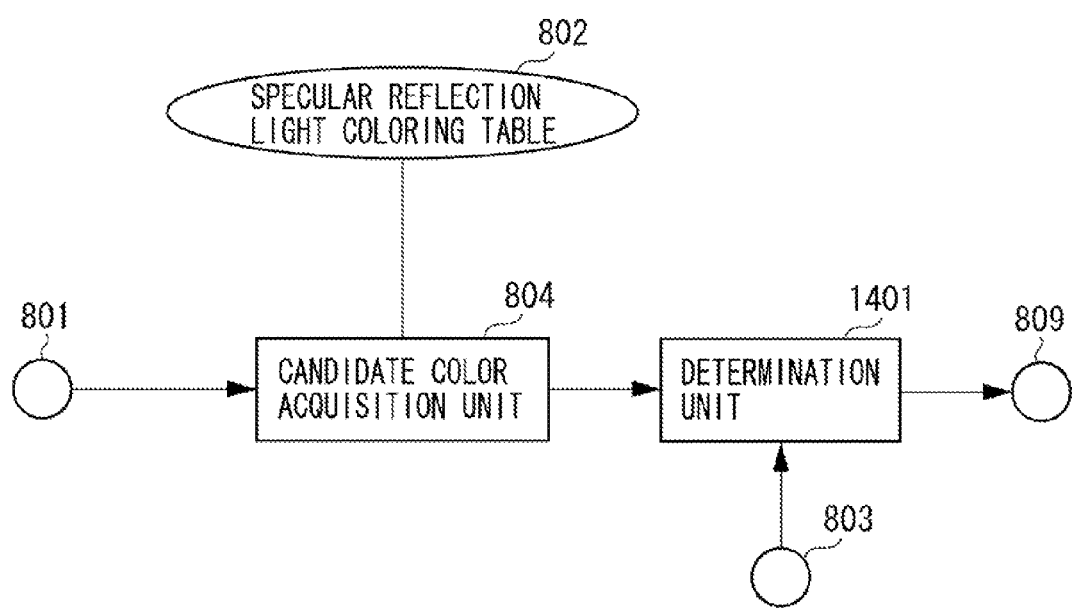
FIG. 14 is a block diagram illustrating a functional configuration of clear ink amount determination processing according to a third exemplary embodiment of the present invention.

FIG. 14 is a block diagram illustrating a functional configuration of the clear ink amount determination processing 504 according to the third exemplary embodiment. A determination unit 1401 receives candidate colors acquired by the candidate color acquisition unit 804, and target data input by the target data input unit 803. The determination unit 1401 determines a clear ink amount at a target pixel, and outputs it to the output unit 809.

Figure 15:
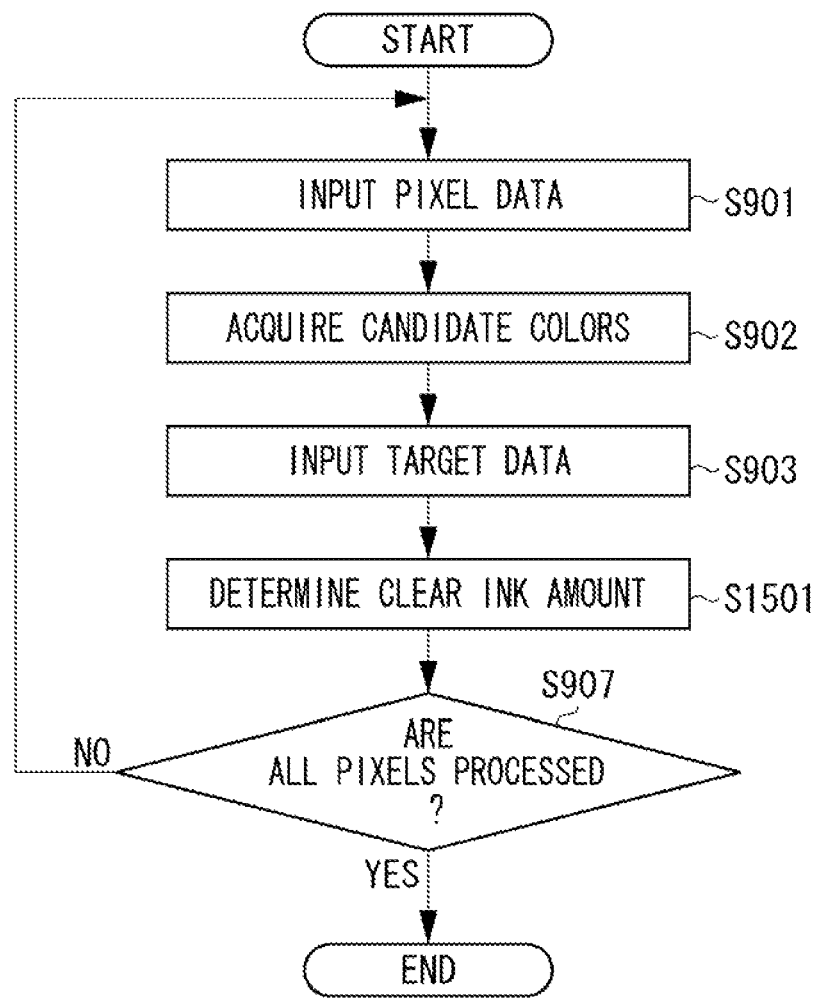
FIG. 15 is a flowchart illustrating the clear ink amount determination processing according to the third exemplary embodiment.

FIG. 15 is a flowchart illustrating the clear ink amount determination processing 504 according to the third exemplary embodiment. In step S1501, the determination unit 1401 calculates color differences between the a*b* values of the eight candidate colors, and the target data, and identifies the candidate color that has the smallest color difference. The determination unit 1401 refers to the specular reflection light coloring table 802, and outputs the clear ink amount corresponding to the identified candidate color to the output unit 809.

A clear ink amount is determined for each pixel by performing the above-described processing on all of the pixels.

The third exemplary embodiment has been described based on an example in which color differences are calculated between the a*b* values of eight candidate colors, and target data, but the third exemplary embodiment is not limited to this example. For example, the determination unit 1401 may be omitted. In this case, in the specular reflection light coloring table 802, relationships are established in advance between the input signal values illustrated in FIG. 6 and clear ink values capable of minimizing coloring to the input signal values. Then, the candidate color acquisition unit 894 refers to this specular reflection light coloring table 802 to output the clear ink value corresponding to an input signal value input by the input unit 801 to the output unit 809, whereby the same effect can be provided.

Execution of the above-described processing enables a determination of a clear ink amount so as to minimize coloring at each pixel. As a result, global coloring of specular reflection light can be also reduced. Further, the third exemplary embodiment does not diffuse an error (coloring), and therefore realizes simple and fast processing, compared to the first and second exemplary embodiments.

This processing has been described as the method of determining a clear ink amount capable of minimizing coloring at each pixel. According to this method, a clear ink amount is fixedly determined according to an RGB value on which the clear ink is overlaid. However, fixedly determining a clear ink amount at an image region including adjacent pixels having a same RGB value or an image region with a clear ink amount of zero may result in occurrence of uneven glossiness between that image region and an image region without a uniform clear amount.

This problem can be solved by overlaying different clear ink amounts at an image region having a same RGB value. Possible methods therefor include, for example, a method of setting a variation in target data, or a method of changing the processing by the determination unit 1401.

The method of setting a variation in target data is realized by a method of providing a random number generation unit which is not illustrated in FIG. 14, and adding a value to target data according to a generated random number, or a method of performing and storing different target data for each pixel, and referring to it for each pixel.

On the other hand, as the method of changing the processing by the determination unit 1401, the processing can be changed so that the determination unit 1401 identifies a candidate color having the second or third least color difference, instead of identifying a candidate color having the least color difference, and outputs the corresponding data. In this case, the ranking of a color difference to select a candidate color for each pixel may be determined by providing a random number generator not illustrated in FIG. 14 to determine the ranking according to a generated random number, or storing data of predetermined ranking to determine the ranking by referring to the stored data at appropriate timing when the determination unit 1401 makes a comparison.

Execution of the above-described processing enables a reduction in occurrence of uneven glossiness while reducing coloring at each pixel, even if there is an image region including adjacent pixels having a same RGB value, or an image region having a clear ink amount of zero.

The first to third exemplary embodiments set a unit having the same size as a pixel on an input image as a smallest unit of a region for which a clear ink amount is determined in the clear ink amount determination processing. However, a problem arises in that an input image having a large number of pixels increases a time required for the processing.

Generally, in an ordinary image, adjacent pixels often have similar RGB values, although each pixel has a different RGB value. Therefore, as a fourth exemplary embodiment of the present invention, a description will be given of a method of setting adjacent pixels as a smallest unit of a region for which a clear ink amount is determined, assuming that adjusting pixels are similar, and determining a clear ink value for each of that smallest unit. The fourth exemplary embodiment will be briefly described, mainly focusing on differences from the above-described exemplary embodiments.

Figure 16:
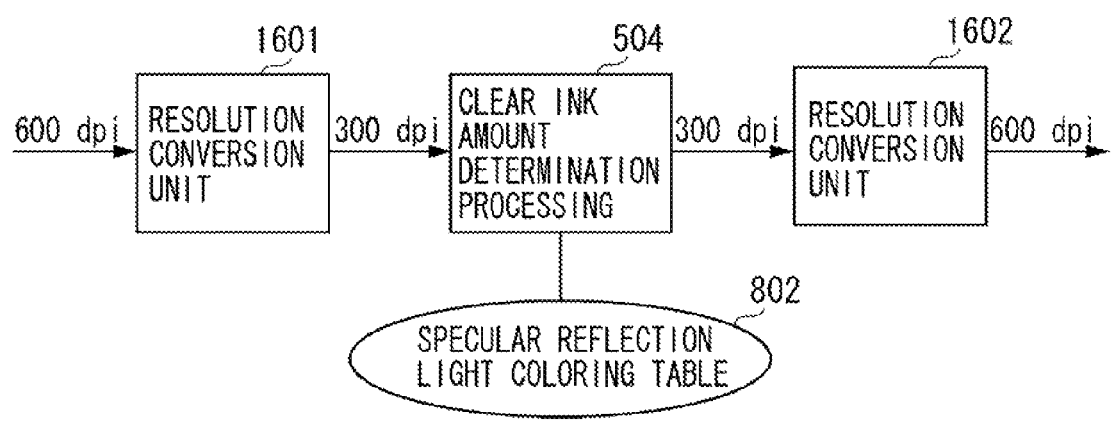
FIG. 16 is a block diagram illustrating a functional configuration of clear ink amount determination processing according to a fourth exemplary embodiment of the present invention.

FIG. 16 is a block diagram illustrating a functional configuration of the clear ink amount determination processing 504 according to the fourth exemplary embodiment. The fourth exemplary embodiment includes a resolution conversion unit 1601 as pre-processing for the clear ink amount determination processing 504, and a resolution conversion unit 1602 as post-processing for the clear ink amount determination processing 504.

Figure 17A:
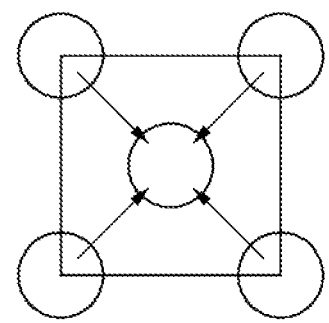
FIG. 17A illustrates a resolution conversion according to the fourth exemplary embodiment.

The resolution conversion unit 1601 applies a low resolution conversion to an image after the color matching, and outputs an image having a lower resolution than the resolution of the input data image. As one example, it is assumed that the resolution of an image after the color matching is 600 dpi, and an image having a resolution of 300 dpi is output as the image after the resolution conversion. The resolution conversion method may be embodied by a known method. For example, the pixel value of a pixel after the resolution conversion is an average of pixel values of four pixels surrounding the pixel before the resolution conversion. FIG. 17A schematically illustrates the processing applied by the resolution conversion unit 1601 to a target pixel and four pixels surrounding the target pixel.

Figure 17B:
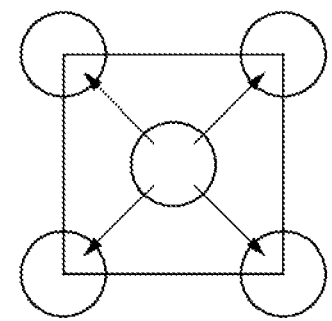
FIG. 17B illustrates a resolution conversion according to the fourth exemplary embodiment.

The resolution conversion unit 1602 applies a high resolution conversion to an image after the clear ink amount determination processing and returns the resolution of the image to the resolution of the image after the color matching. As one example, it is assumed that the resolution of an image after the color matching is 600 dpi, the resolution of the image after the processing by the resolution conversion unit 1601 is 300 dpi, and an image having a resolution of 600 dpi is output as the image after the resolution conversion. The resolution conversion method may be embodied by a known method. In other words, the pixel value of a pixel after the processing by the resolution conversion unit 1602 is returned to the pixel value before the processing by the resolution conversion unit 1601, while this pixel has the same clear ink amount as that of the surrounding pixels (300 dpi) before the processing by the resolution conversion unit 1602. The conversion may be applied to clear ink amounts of surrounding pixels, instead of surrounding pixels. FIG. 17B schematically illustrates the processing that the resolution conversion unit 1602 applies to a target pixel and four pixels surrounding the target pixel. It should be noted that the above-described resolution conversion is applied only to the clear ink amount determination, and is not applied to the determination of ink amounts of the color inks.

In the above description, the resolution conversion unit 1601 reduces a resolution by half, but may reduce a resolution to a quarter or an one-eighth of the original resolution.

Execution of the above-description processing enables a reduction in a calculation time required for the clear ink amount determination processing although requiring an additional time for the processing by the resolution conversion units 1601 and 1602, compared to the first and second exemplary embodiments.

The above-described exemplary embodiments determine a clear ink amount for each pixel so as to reduce coloring of an image as a whole. As a fifth exemplary embodiment of the present invention, a description will be given of a method dividing an image and determining a clear ink amount for each pixel so as to reduce coloring of each divided region. In other words, similarly to the fourth exemplary embodiment, assuming that adjacent pixels have similar pixel values, the fifth exemplary embodiment aims at a reduction in coloring of an image as a whole by reducing coloring of each divided region.

Figure 18:
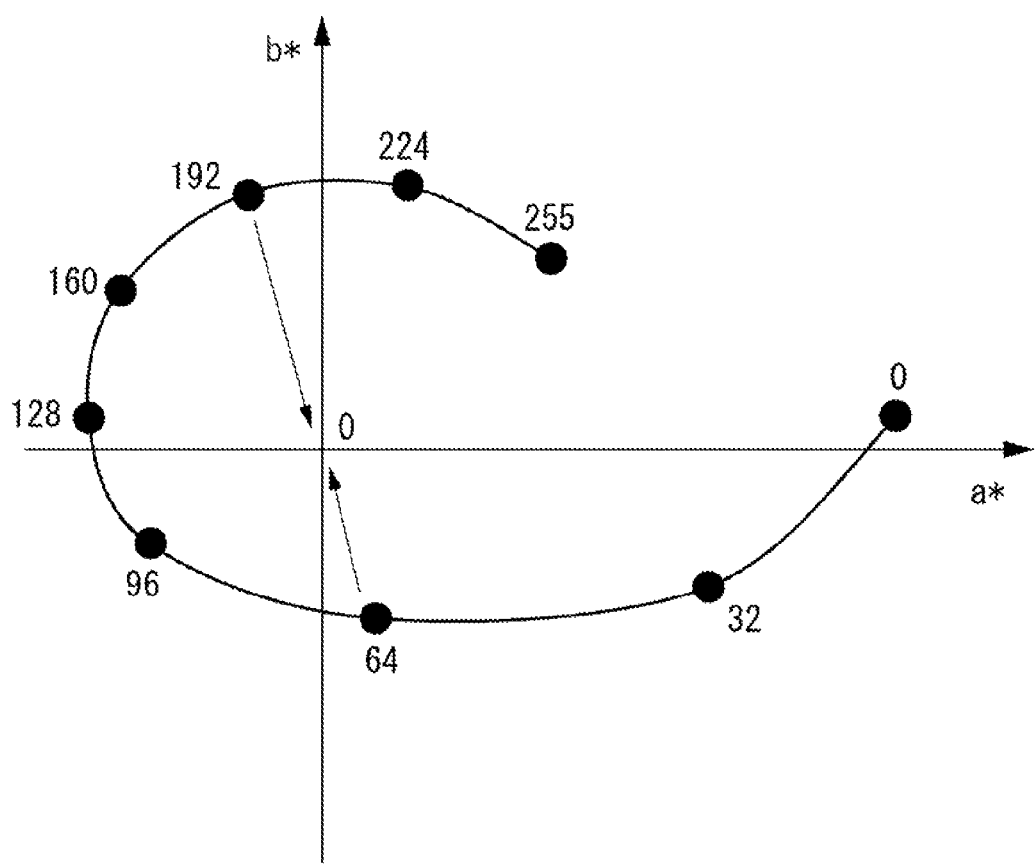
FIG. 18 is a graph illustrating a principle of a fifth exemplary embodiment of the present invention.

First, an overview of the fifth exemplary embodiment will be provided. The fifth exemplary embodiment measures coloring of specular reflection light when the clear ink amount is changed for each RGB value, similarly to the first to fourth exemplary embodiments, as an advance preparation. For example, FIG. 18 is a graph schematically illustrating coloring of specular reflection light when nine different clear ink amounts are laid, each of which is plotted on the a*b* plane in the L*a*b color system. The fifth exemplary embodiment selects two colors causing coloring in a complementary relationship to each other (a relationship diagonally located on the a*b* plane), from the measurement results. These selected clear ink amounts A and B are set as a pair. For example, in the example illustrated in FIG. 18, A is 64, and B is 192.

Figure 19:
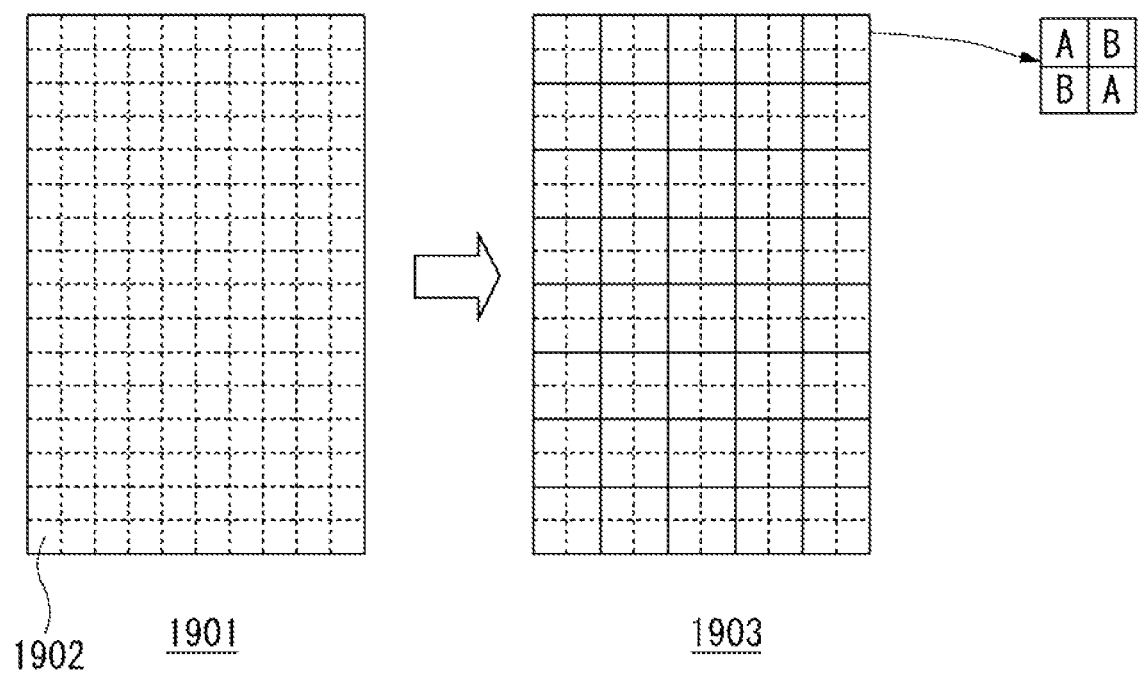
FIG. 19 schematically illustrates the principle of the fifth exemplary embodiment.

FIG. 19 schematically illustrates the principle of the fifth exemplary embodiment. In FIG. 19, a pre-division image 1901 contains pixels 1902. The dotted lines indicate boundaries between pixels, and the respective pixels have respective RGB values. In a post-division image 1903, the image is divided into square regions, each of which contains four pixels consisting of vertically adjacent two pixels and horizontally adjacent two pixels. The solid lines indicate boundaries between the divided regions. Then, the above-described pair of two clear ink amounts is assigned to an average value of RGB values of pixels existing in a divided region. For example, the clear ink amount A is assigned to the upper left pixel and the lower right pixel in a divided region and the clear ink amount B is assigned to the upper right pixel and the lower left pixel in the divided region, so that the clear ink amount A and the clear ink amount B are alternately located. Determining a clear ink amount in this way results in establishment of a complementary relationship between coloring phenomena at respective pixels, whereby the coloring phenomena can be canceled out each other in a divided region, leading to a reduction in global coloring.

Figure 20:
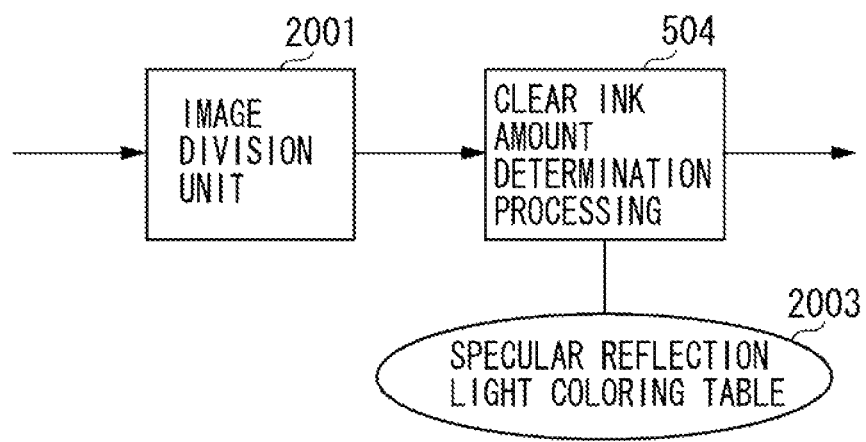
FIG. 20 is a block diagram illustrating a functional configuration of clear ink amount determination processing according to the fifth exemplary embodiment.

Next, the fifth exemplary embodiment will be described in more detail. This description will be briefly given, mainly focusing on differences from the above-described exemplary embodiments FIG. 20 is a block diagram illustrating a functional configuration of the clear ink amount determination processing according to the fifth exemplary embodiment. An image division unit 2001 divides an image expressed by 8-bit RGB image data input from the color matching 502, into square regions each containing four pixels consisting of vertically adjacent two pixels and horizontally adjacent two pixels, as illustrated in FIG. 19. Then, the image division unit 2001 outputs the divided image data to the clear ink amount determination processing 504. The clear ink amount determination processing 504 determines a clear ink amount for each of the pixels in a target region divided by the image division unit 2001. The clear ink amount determination processing 504 determines clear ink amounts for all of the divided regions. Further, as described above, the clear ink amount determination processing 504 determines a clear ink amount by referring to a pre-formed specular reflection light coloring table 2003. Therefore, the method of forming the specular reflection light coloring table 2003 will be now described.

FIG. 21 illustrates an example of the specular reflection light coloring table 2003. The table 2003 stores RGB values, which are input signal values, in the form of 8-bit data in the first to third columns. The table 2003 further stores two clear ink amounts causing coloring phenomena in a complementary relationship to each other for each RGB value in the fourth and fifth columns. The specular reflection light coloring table 2003 is formed based on data acquired from the processing illustrated in the flowchart of FIG. 7. More specifically, first, two kinds of coloring are selected from eight kinds of coloring of specular reflection light acquired from the processing illustrated in the flowchart of FIG. 7, i.e., (ai*, bi*) (i=1 to 8). There are 8C2=28 choices in this case. If the selected two kinds of coloring are expressed as (a1*, b1*) and (a2*, b2*), the average value of saturations of the two kinds of coloring is expressed by the following equation.

$$\sqrt{((a1^*+a2^*)/2)^2+((b1^*+b2^*)/2)^2} \qquad \text{[Math. 4]}$$

This average value is also calculated for all of the other combinations, and then the combination having the smallest average value among the calculated average values is identified. The clear ink amounts of the respective items in the identified combination are stored in the fourth column and the fifth column of the specular reflection light coloring table 2003. The specular reflection light coloring table 2003 is formed by performing this calculation for all RGB values.

Figure 22:
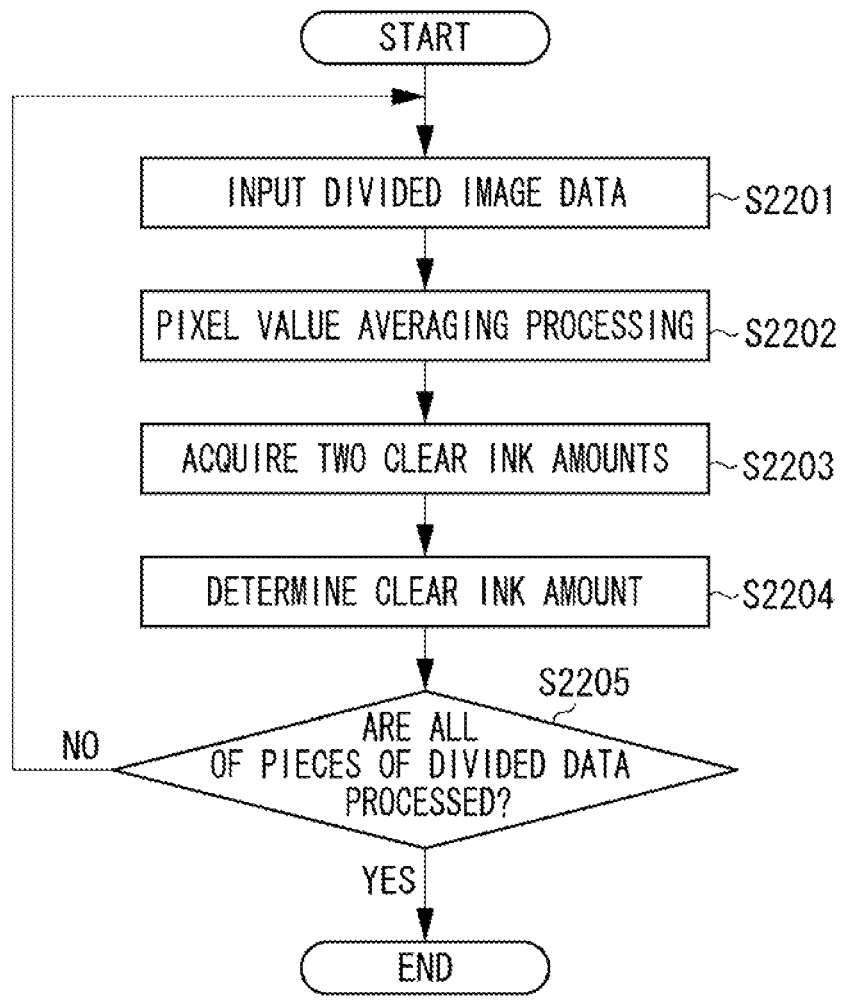
FIG. 22 is a flowchart illustrating the clear ink amount determination processing according to the fifth exemplary embodiment.

Next, an operation of the clear ink amount determination processing 504 will be described with reference to the flowchart illustrated in FIG. 22.

First, in step S2201, the clear ink amount determination processing 504 inputs divided image data of a target region divided by the image division unit 2001 and constituted by four pixels. In step S2202, the clear ink amount determination processing 504 calculates an average value of the respective RGB values of the input four pixels. In step S2203, the clear ink amount determination processing 504 refers to the specular reflection light coloring table 2003, and acquires two clear ink amounts (CL1 and CL2) corresponding to the RGB value calculated in step S2202. In step S2204, the clear ink amount determination processing 504 determines clear ink amounts in such a manner that the CL1 is set as the clear ink amounts on the upper left and lower right pixels of the divided image and the CL2 is set as the clear ink amounts on the upper right and lower left pixels of the divided image. In step S2205, the clear ink amount determination processing 504 determines whether steps S2201 to S2204 are performed to all of the pieces of divided image data. In case that the determination result is NO (NO in step S2205), the processing returns to step S2201. On the other hand, in case that the determination result is YES (YES in step S2205), the processing is ended.

The image division method is not limited to the method of dividing an image into square regions each constituted by four pixels of vertically adjacent two pixels and horizontally adjacent two pixels. An image may be divided into any ranges making coloring visually inconspicuous such as square regions each constituted by nine pixels of vertically adjacent three pixels and horizontally adjacent three pixels, or rectangular regions each constituted by vertically adjacent two pixels and horizontally adjacent three pixels. In other words, an image may be divided by any division method. Further, an image may be divided into regions having various sizes.

Further, the assignment of clear ink amounts in a divided image is not limited to the above-described method. The CL1 may be assigned to upper left and lower left pixels, and the CL2 may be assigned to upper right and lower right pixels. Alternatively, the CL1 and CL2 may be assigned to not only two pixels but also another number of pixels, respectively. The number of pixels to which the CL1 is assigned may be any of zero to four depending on the clear ink amount.

Figure 23:
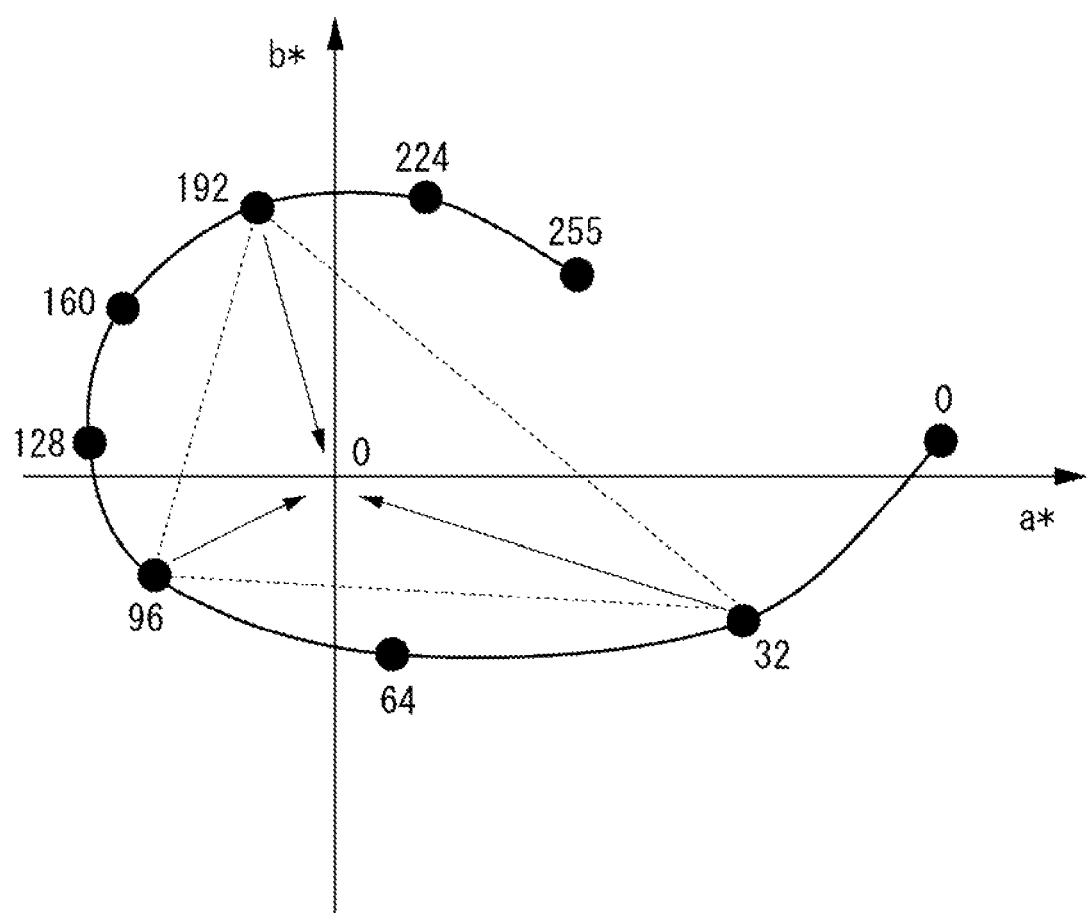
FIG. 23 is a graph illustrating the relationship between the clear ink amount and coloring according to the fifth exemplary embodiment.

Further, three or more kinds of clear ink amounts may be adopted, instead of two kinds of clear ink amounts. For example, as illustrated in FIG. 23, the points of coloring with the clear ink amounts 32, 96, and 192 are set as vertices on the a*b* plane. The three kinds of coloring with three clear ink amounts can be positioned inside the triangle defined by the vertices by weighting the coloring of the vertices. The coloring can be reduced by selecting three clear ink amounts so that the origin point on the a*b* plane is located inside this triangle, and calculating the ratio of weighting to the respective selected ink amounts based on the distances from the origin point, i.e., the strengths of coloring. In this case, the specular reflection light coloring table 2003 stores the ratio, as illustrated in FIG. 24. Then, the clear ink amount determination processing 2002 determines a clear ink amount to reduce coloring of specular reflection light per pixel in a divided image so as to satisfy this ratio.

According to this processing, a clear ink amount is determined for each divided image to thereby reduce global coloring of specular reflection light.

The above-described exemplary embodiments determine a clear ink amount for a whole image. However, an image before a clear ink is overlaid thereon may contain image regions having different degrees of conspicuousness of specular reflection light coloring, and it may be redundant to overlay a clear ink on a region with inconspicuous coloring for the purpose of reducing the coloring. Therefore, as a sixth exemplary embodiment of the present invention, a description will be given of a method of locating an image region having conspicuous coloring, and overlaying a clear ink on the located image region to reduce the coloring. In the following, a method of analyzing a frequency of an image and a method of utilizing a specular reflection light coloring table will be described as the method of locating an image region having conspicuous coloring of specular reflection light. The description will be briefly given, mainly focusing on differences from the above-described exemplary embodiments.

Coloring of specular reflection light is characterized in that it becomes conspicuous on a solid flat image region in an image. A non-flat image region can reduce global coloring, because various kinds of coloring occur since the RGB value is largely changed on the surface of such an image, resulting in cancelling out the coloring. On the other hand, a flat image region cannot easily reduce coloring, because generated coloring tends to be in a specific color phase since the RGB value is slightly changed on the surface of such an image. Therefore, a method of detecting a pixel in a flat image region in an image will be now described.

Figure 25:
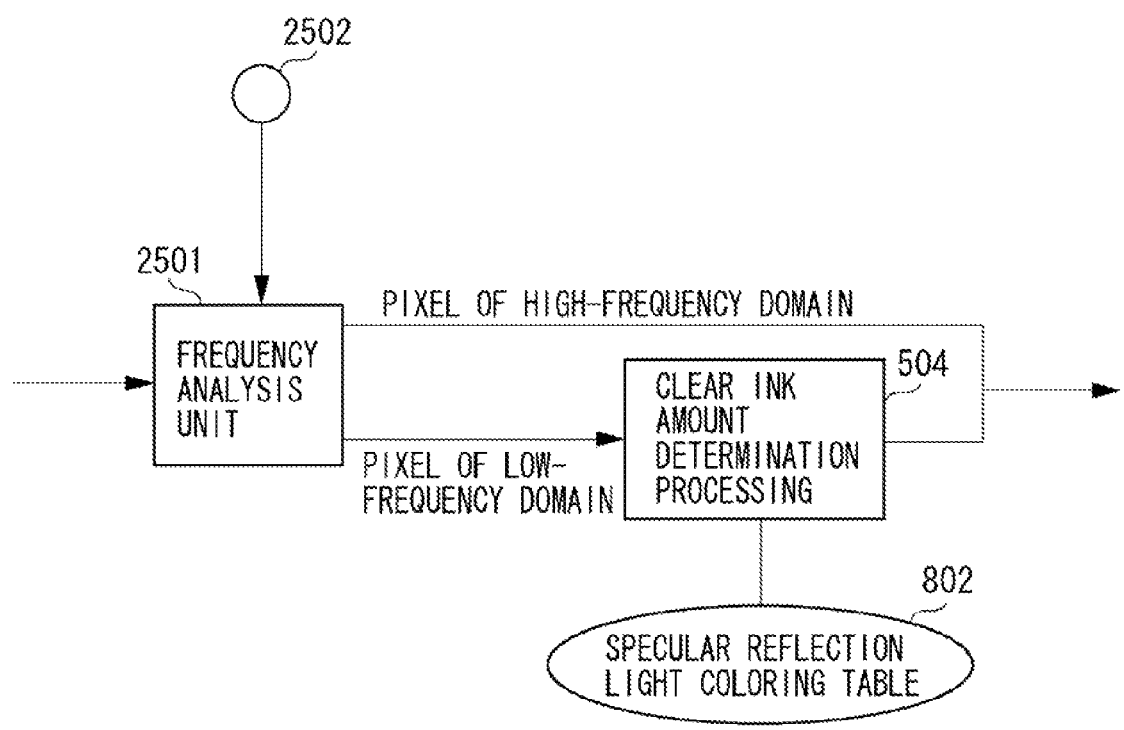
FIG. 25 is a block diagram illustrating a functional configuration of clear ink amount determination processing according to a sixth exemplary embodiment of the present invention.

FIG. 25 is a block diagram illustrating a functional configuration of the clear ink determination processing with use of a frequency analysis according to the present exemplary embodiment. An input unit 2502 inputs RGB image data from the application 501. A frequency analysis unit 2501 performs pre-processing for the clear ink amount determination processing 504. The frequency analysis unit 2501 analyzes the frequency of the RGB image data input from the input unit 2502, and divides the data into pixels of high-frequency domain and pixels of low-frequency domain. The frequency analysis unit 2501 outputs pixels of low-frequency domain to the clear ink amount determination processing 504, and outputs pixels other than pixels of low-frequency domain to the gamma correction processing 505. A fixed value (for example, zero) is set as a clear ink amount for pixels other than pixels of low-frequency domain. Further, the frequency analysis processing may be performed by a known method.

According to the above-described processing, a flat region in an image is located, and a clear ink amount is determined for only that region. As a result, it becomes possible to reduce coloring by overlaying a clear ink only on the region having conspicuous coloring of specular reflection light.

Figure 26:
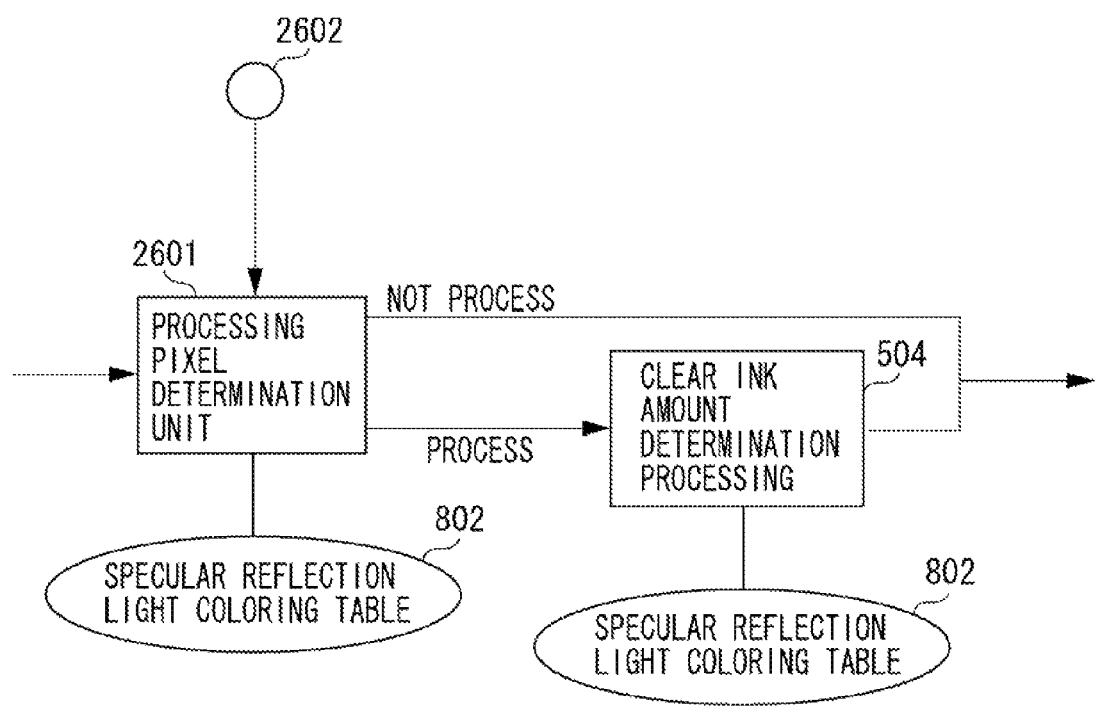
FIG. 26 is a block diagram illustrating a clear ink amount determination processing unit according to the sixth exemplary embodiment.

FIG. 26 is a block diagram illustrating a functional configuration of the clear ink amount determination processing with use of the specular reflection light coloring table according to the present exemplary embodiment. A processing pixel determination unit 2601 performs pre-processing for the clear ink amount determination processing 504, A retention unit 2602 retains a predetermined threshold value (for example, $C^*=10$) defining an allowable range of coloring of specular reflection light.

The processing pixel determination unit 2601 refers to the specular reflection light coloring table to acquire coloring when a clear ink is not overlaid thereon (when the clear ink amount is zero), for each RGB value of input RGB image data. The processing pixel determination unit 2601 compares this coloring and the coloring threshold value retained by the retention unit 2602. As a result of the comparison, in case that the acquired coloring is greater than the coloring threshold value, the processing pixel determination unit 2601 outputs the RGB value corresponding to the acquired coloring to the clear ink amount determination processing 504. In case that the acquired coloring is smaller than the coloring threshold value, the processing pixel determination unit 2601 outputs it to the gamma correction unit 505.

According to the above-described processing, a region having conspicuous coloring is located, and a clear ink amount is determined for only the located region. As a result, it becomes possible to reduce coloring by overlaying a clear ink only on the region having conspicuous coloring of specular reflection light.

Further, the above-described exemplary embodiments have been described based on an example of overlaying a clear ink, but the present invention is not limited thereto. That is, the discharge data of a clear ink, which is processed by the mask processing of the mask data conversion unit, may not be laid on the outermost surface of a sheet.

Further, the present invention can be also embodied by providing a system or an apparatus with a storage medium storing program codes of software capable of realizing the functions (for example, the functions indicated in the above-described flowcharts) of the above-described exemplary embodiments. In this case, a computer (or a CPU or a micro processing unit (MPU)) of the system or the apparatus reads out and executes the program codes that is stored in the storage medium in a computer readable manner, thereby realizing the functions of the above-described exemplary embodiments.

Further, the above-described exemplary embodiments may be used as a combination of any of them. According to the present invention, it is possible to provide image processing capable of comprehensively reducing coloring of specular reflection light.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

The invention claimed is:

1. An image processing apparatus configured to convert image data into color material data including (i) color material data indicating a color material amount of a chromatic color material and (ii) color material data indicating a color material amount of an achromatic color material, the image processing apparatus comprising:
   a CPU (central processing unit) coupled to a memory;
   a conversion unit configured to convert image data of a pixel of interest into (i) the color material data of the chromatic color material;
   a determination unit configured to determine (ii) the color material data of the achromatic color material on the pixel of interest based on (A) coloring information corresponding to the converted color material data of the chromatic color material and (B) coloring information that occurs at surrounding pixels that surround the pixel of interest; and
   a calculation unit configured to calculate coloring information that occurs at the pixel of interest based on (C) coloring information corresponding to a combination of (i) the converted color material data of the chromatic color material and (ii) the determined color material data of the achromatic color material and (B) the coloring information that occurs at the surrounding pixels,
   wherein the conversion unit, the determination unit, and the calculation unit are realized by the CPU.

2. The image processing apparatus according to claim 1, further comprising:
   an application configured to perform processing for generating the image data; and
   a print driver coupled to the application and configured to perform processing on the image data received from the application, wherein processing performed by the print driver includes color matching, color separation, clear ink amount determination, gamma correction, halftoning, and print data generation,
   wherein processing of the application and the print driver is configured to be executed by the CPU.

3. The image processing apparatus according to claim 2, wherein the image processing apparatus is a personal computer (PC) configured to be coupled to an inkjet printer.

4. The image processing apparatus according to claim 3, wherein the printer driver, in the personal computer whose processing is configured to be executed by the CPU, further is configured to perform processing of a dot pattern assignment unit and a mask data conversion unit in the inkjet printer.

5. The image processing apparatus according to claim 1, wherein the determination unit includes:
   a calculating unit configured to calculate a color difference between the coloring information corresponding to the combination of the converted color material data of the chromatic color material and the determined color material data of the achromatic color material and the coloring information that occurs at the surrounding pixels, and
   a selection unit configured to select coloring information corresponding to a combination having a small color difference among the combination as the coloring information that occurs at the pixel of interest.

6. The image processing apparatus according to claim 1, wherein the calculation unit includes a diffusion unit configured to diffuse the coloring information that occurs at the pixel of interest to the surrounding pixels.

7. The image processing apparatus according to claim 6, wherein the calculation unit includes a correction unit configured to correct the coloring information that occurs at the pixel of interest in response to the diffused coloring information being larger than a predetermined value.

8. The image processing apparatus according to claim 1, further comprising a recording unit configured to record the achromatic color material on a recording medium based on the determined color material data of the achromatic color material,
   wherein the recording unit records the achromatic color material after recording the chromatic color material.

9. The image processing apparatus according to claim 1, further comprising a resolution conversion unit realized by the CPU and configured to convert a resolution of the image data,
   wherein the determination unit determines the color material data of the achromatic color material on a region of interest of the image data with the converted resolution.

10. The image processing apparatus according to claim 1, further comprising a determining unit realized by the CPU and configured to determine an image region of the image data,
   wherein the determination unit determines the color material data of the achromatic color material on a region of interest in the determined image region.

11. The image processing apparatus according to claim 10, wherein the determining unit performs a frequency analysis on the image data and, as a result of the frequency analysis, determines a pixel of low-frequency domain.

12. The image processing apparatus according to claim 10, wherein the determining unit determines the image region based on the coloring information corresponding to the combination of the converted color material data of the chromatic color material and the determined color material data of the achromatic color material and a threshold value.

13. The image processing apparatus according to claim 1, wherein the coloring information corresponding to the combination of the converted color material data of the chromatic color material and the determined color material data of the achromatic color material is coloring information corresponding to a combination in response to the color material data of the achromatic color material being changed for each color material data of the chromatic color material.

14. The image processing apparatus according to claim 1, wherein the coloring information corresponding to the color material data of the chromatic color material and the coloring information corresponding to the combination of the converted color material data of the chromatic color material and the determined color material data of the achromatic color material each are a measurement value acquired by measuring a patch image generated with use of the color material data.

15. The image processing apparatus according to claim 1, wherein the achromatic color material is a clear ink.

16. An image processing method for an image processing apparatus configured to convert image data into color material data including (i) color material data indicating a color material amount of a chromatic color material and (ii) color material data indicating a color material amount of an achromatic color material, the image processing method comprising:
   converting image data of a pixel of interest into (i) the color material data of the chromatic color material;
   determining (ii) the color material data of the achromatic color material on the pixel of interest based on (A) coloring information corresponding to the converted color material data of the chromatic color material and (B) coloring information that occurs at surrounding pixels that surround the pixel of interest; and calculating coloring information that occurs at the pixel of interest based on (C) coloring information corresponding to a combination of (i) the converted color material data of the chromatic color material and (ii) the determined color material data of the achromatic color material and (B) the coloring information that occurs at the surrounding pixels.

17. A non-transitory computer-readable storage medium storing a program to cause an image processing apparatus to perform an image processing method, wherein the image processing apparatus is configured to convert image data into color material data including (i) color material data indicating a color material amount of a chromatic color material and (ii) color material data indicating a color material amount of an achromatic color material, the image processing method comprising:

converting image data of a pixel of interest into (i) the color material data of the chromatic color material;

determining (ii) the color material data of the achromatic color material on the pixel of interest based on (A) coloring information corresponding to the converted color material data of the chromatic color material and (B) coloring information that occurs at surrounding pixels that surround the pixel of interest; and calculating coloring information that occurs at the pixel of interest based on (C) coloring information corresponding to a combination of (i) the converted color material data of the chromatic color material and (ii) the determined color material data of the achromatic color material and (B) the coloring information that occurs at the surrounding pixels.

* * * * *